United States Patent
Keenan

(10) Patent No.: US 6,174,337 B1
(45) Date of Patent: Jan. 16, 2001

(54) METHOD OF CONSTRUCTION OF ELECTROCHEMICAL CELL DEVICE USING CAPILLARY TUBING AND OPTIONAL PERMSELECTIVE POLYMERS

(75) Inventor: Richard L. Keenan, Saratoga, CA (US)

(73) Assignee: Pinnacle Research Institute, Inc., Los Gatos, CA (US)

( * ) Notice: Under 35 U.S.C. 154(b), the term of this patent shall be extended for 0 days.

(21) Appl. No.: 09/461,628

(22) Filed: Dec. 14, 1999

Related U.S. Application Data

(63) Continuation of application No. 08/778,971, filed on Jan. 6, 1997, now abandoned.

(51) Int. Cl.[7] .............................. H01G 9/00; H01M 6/00; B05C 13/00
(52) U.S. Cl. ...................... 29/25.03; 29/623.1; 29/623.2; 427/80; 361/502; 361/503
(58) Field of Search ................................. 29/25.01–25.03, 29/623.1–623.2, 623.4–623.5; 427/80; 361/502–504, 518, 522, 541

(56) References Cited

U.S. PATENT DOCUMENTS

| | | | |
|---|---|---|---|
| 4,028,138 | * | 6/1977 | Dey ....................................... 29/623.2 |
| 4,035,905 | * | 7/1977 | Clement ................................ 29/25.03 |
| 4,842,963 | * | 6/1989 | Ross, Jr. .................................. 429/21 |
| 4,992,910 | * | 2/1991 | Evans ..................................... 361/502 |
| 5,400,211 | * | 3/1995 | Evans ..................................... 361/502 |
| 5,464,453 | * | 11/1995 | Tong et al. ........................... 29/25.03 |
| 5,711,988 | * | 1/1998 | Tsai et al. ............................... 427/80 |

* cited by examiner

Primary Examiner—John F. Niebling
Assistant Examiner—Ha Tran Nguyen
(74) Attorney, Agent, or Firm—Peters Verny Jones & Biksa, LLP

(57) ABSTRACT

The method comprises forming a dry preunit including a stack of cells. Each cell is formed by placing sequentially a conductive support sheet coated on one or both sides with a porous conductive material except at the perimeter edge surfaces, an ion permeable or semi-permeable space separator, a gasket, at least one hollow capillary tube having a melting point higher than the gasket material. Upon heating the gasket material flows, adheres to, and seals the edges of the stack creating a solid integral stack of layers of alternating electrically conductive sheet coated with a porous electrically conducting material and a separator. The gasket material creates a continuous integral external polymer enclosure having hollow capillary tubes. After an electrolyte is introduced into the preunit, the capillary tubes are sealed.

15 Claims, 10 Drawing Sheets

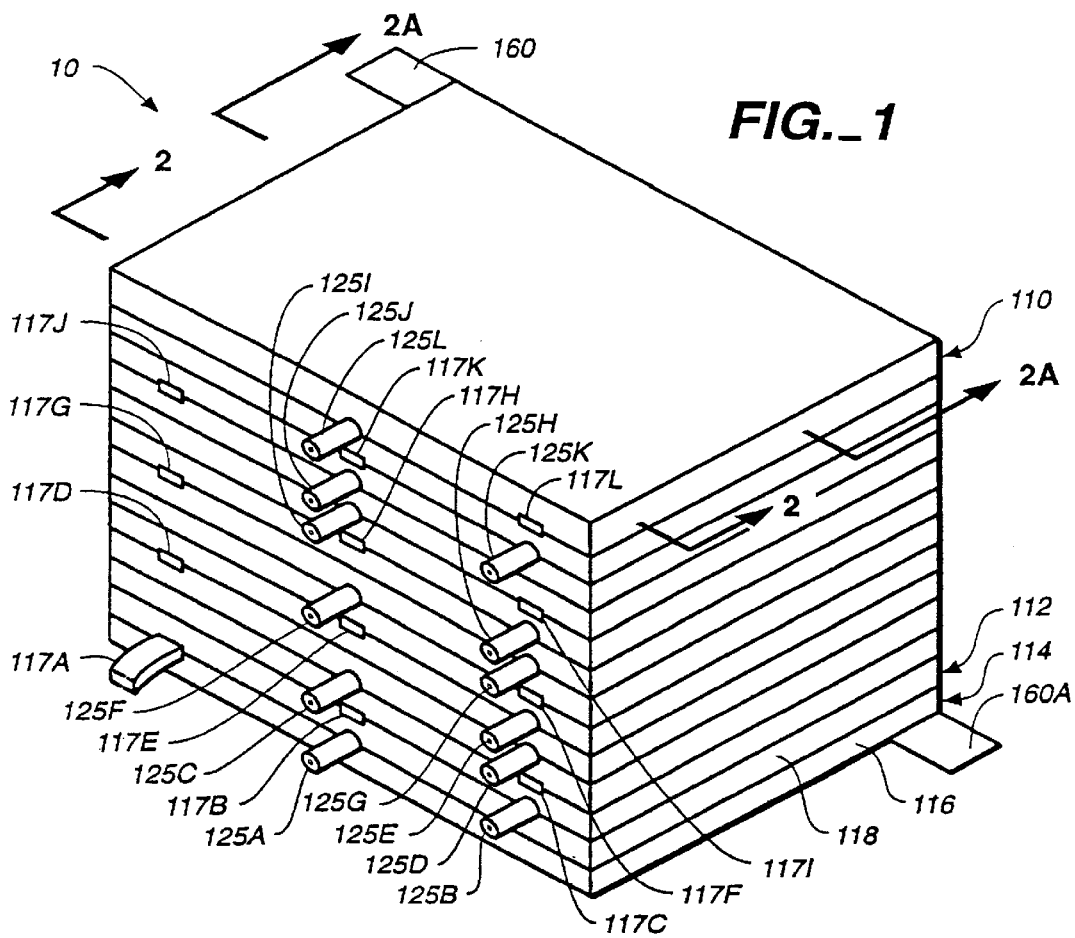
FIG._1
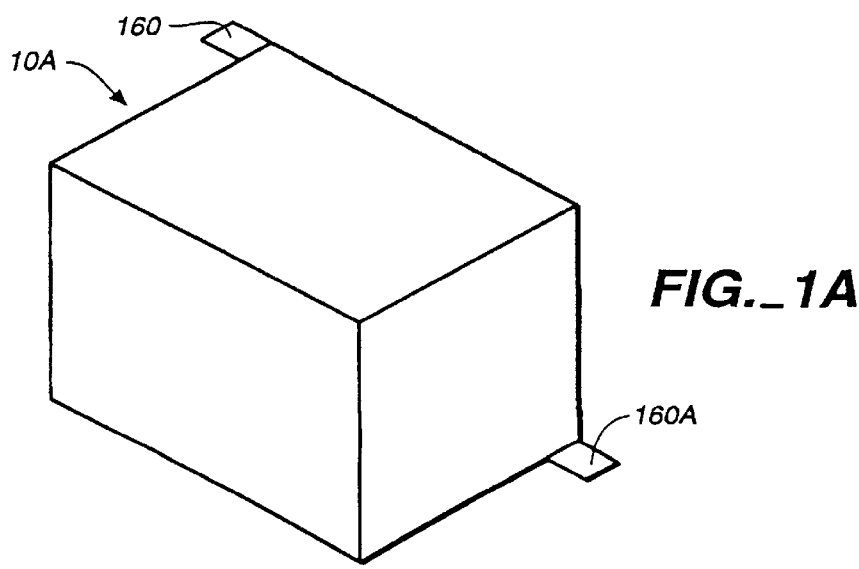
FIG._1A

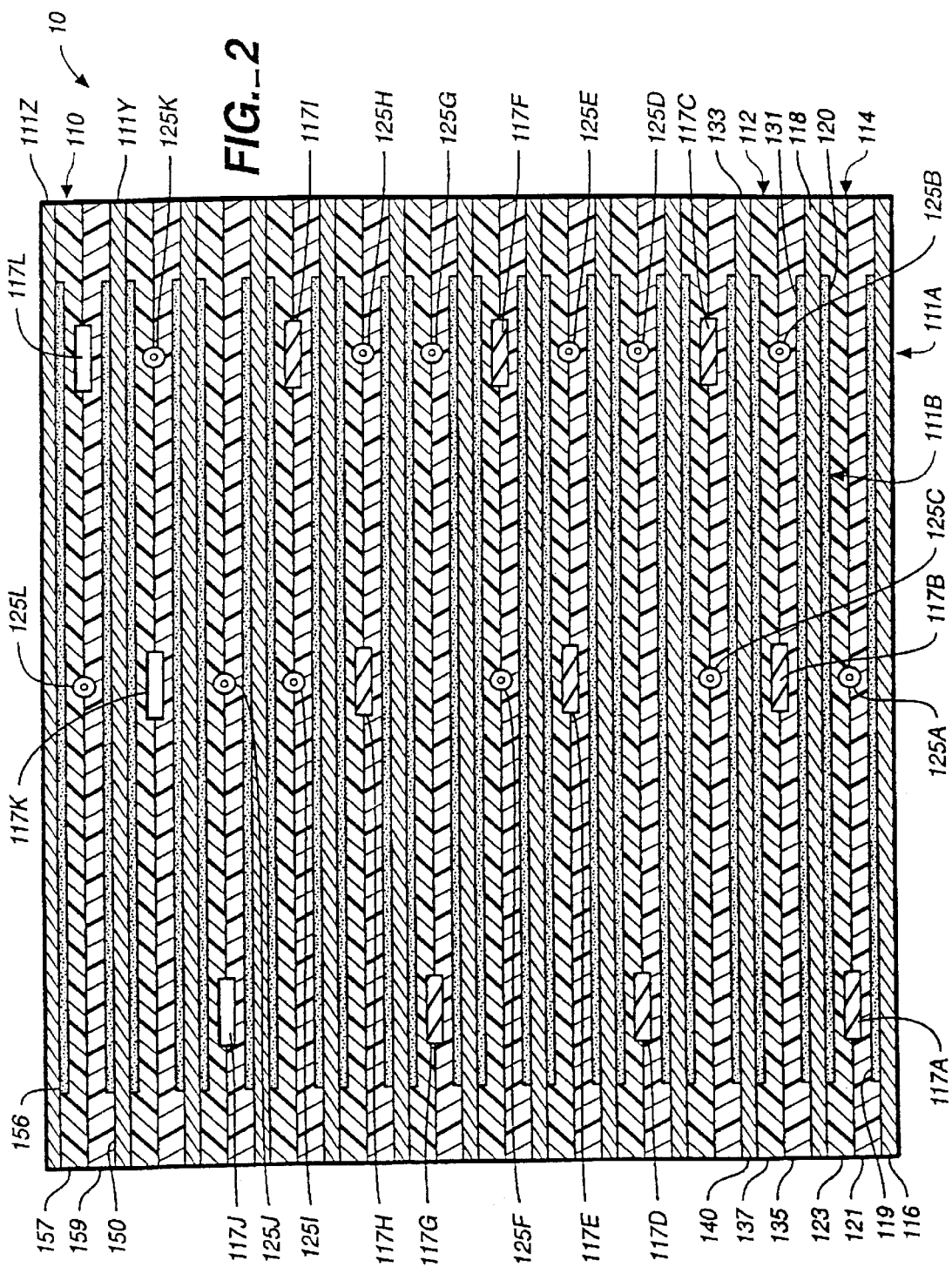
FIG._2

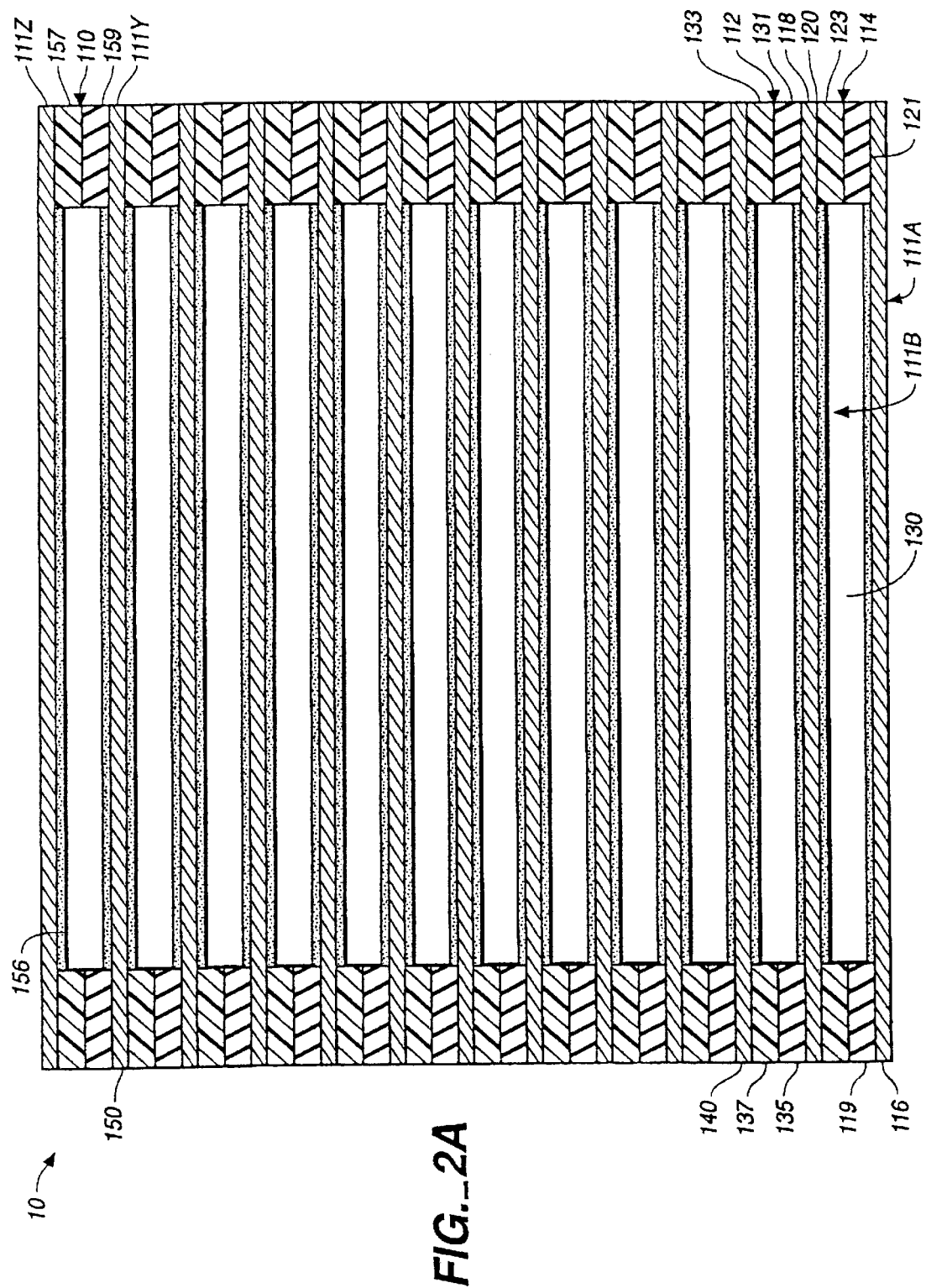
FIG._2A

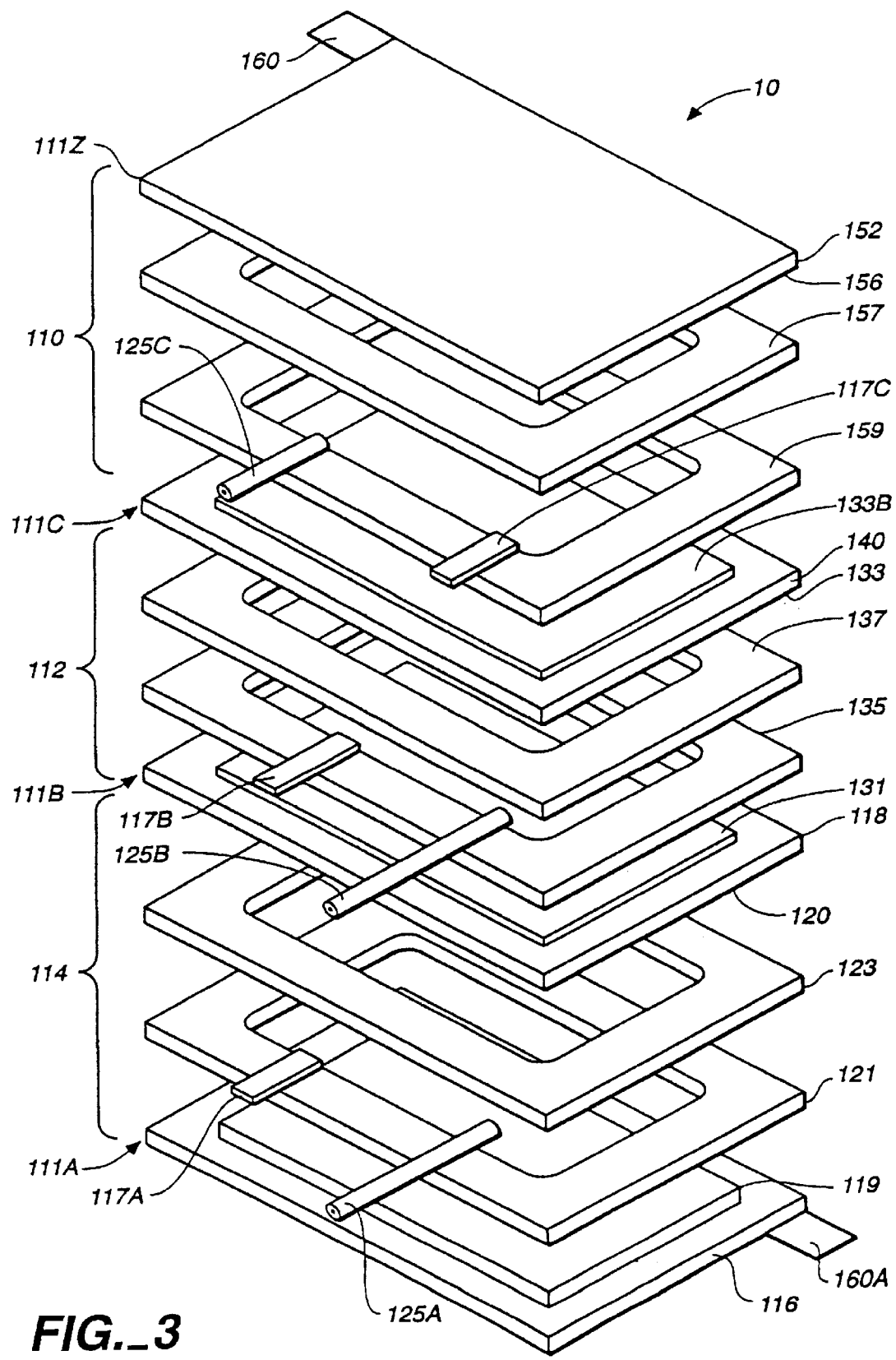
FIG._3

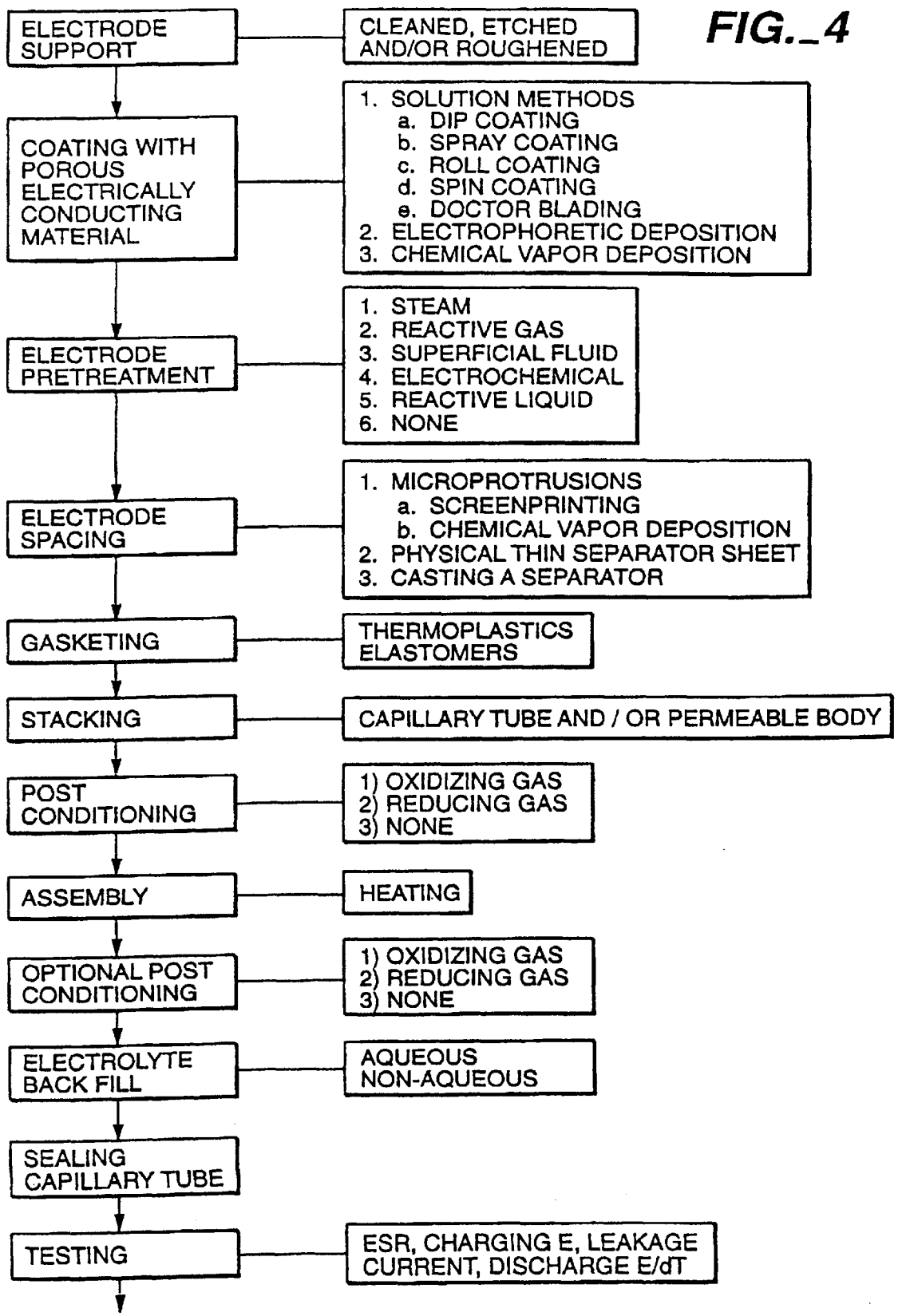
FIG._4

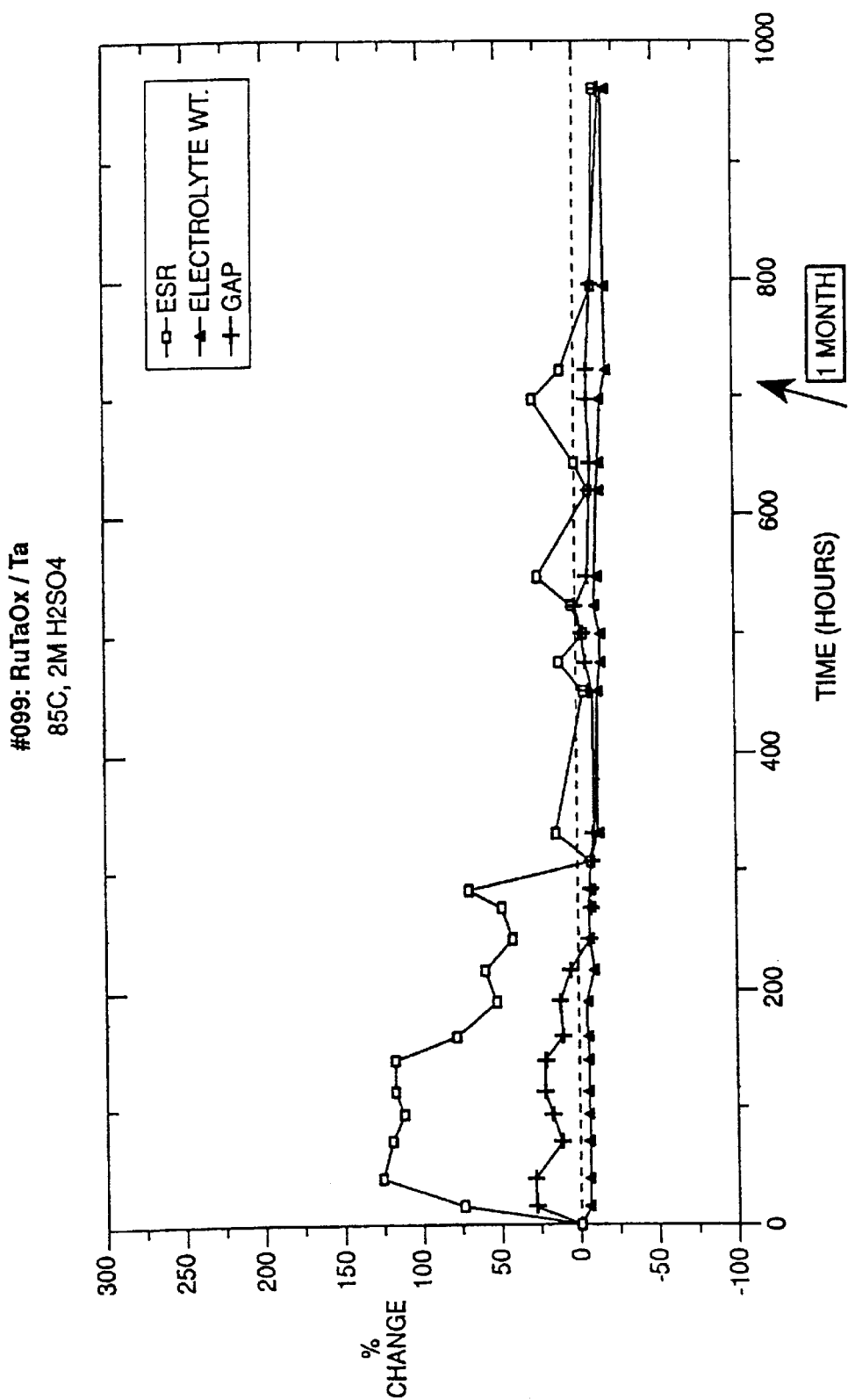
FIG._5

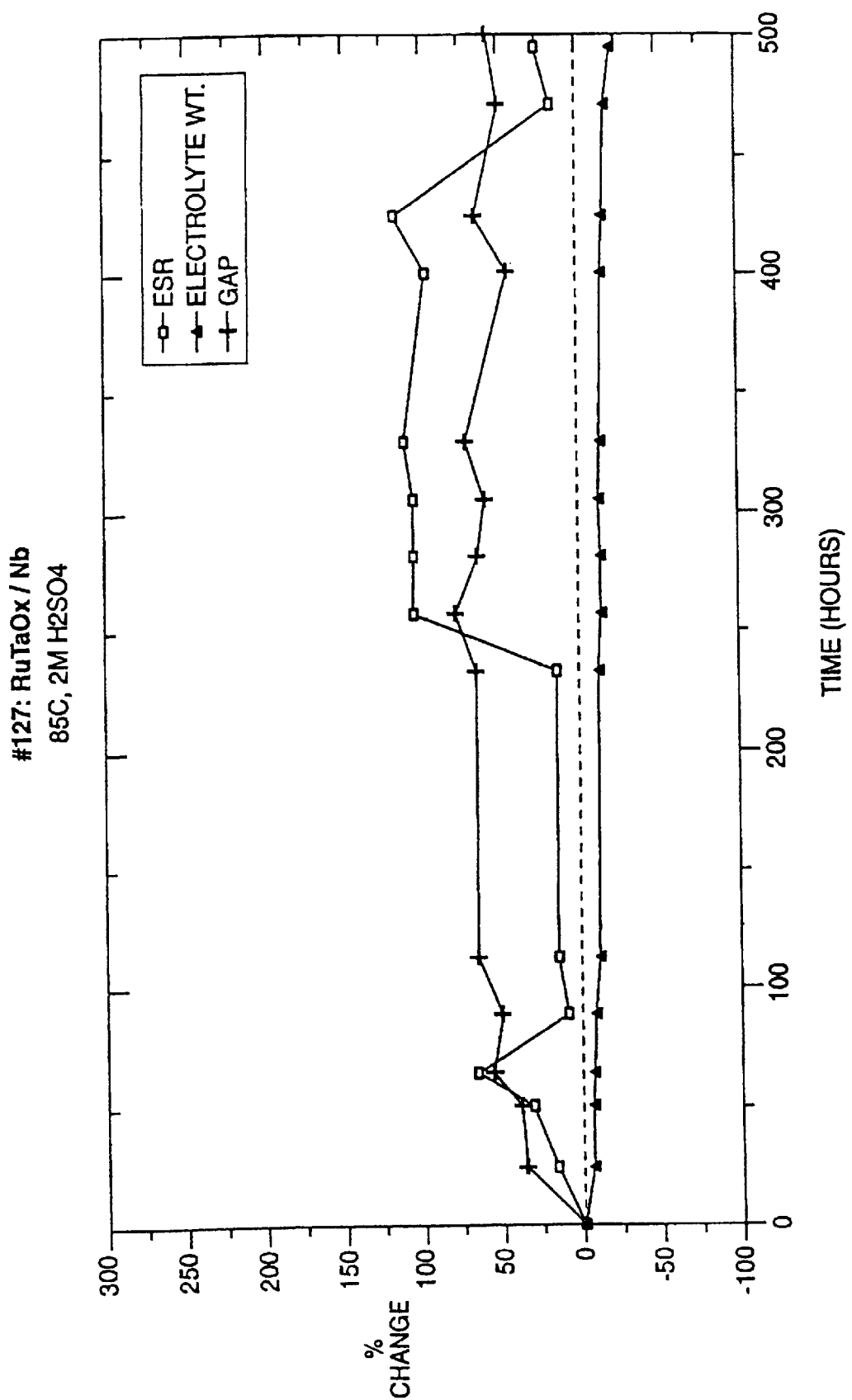
FIG._6

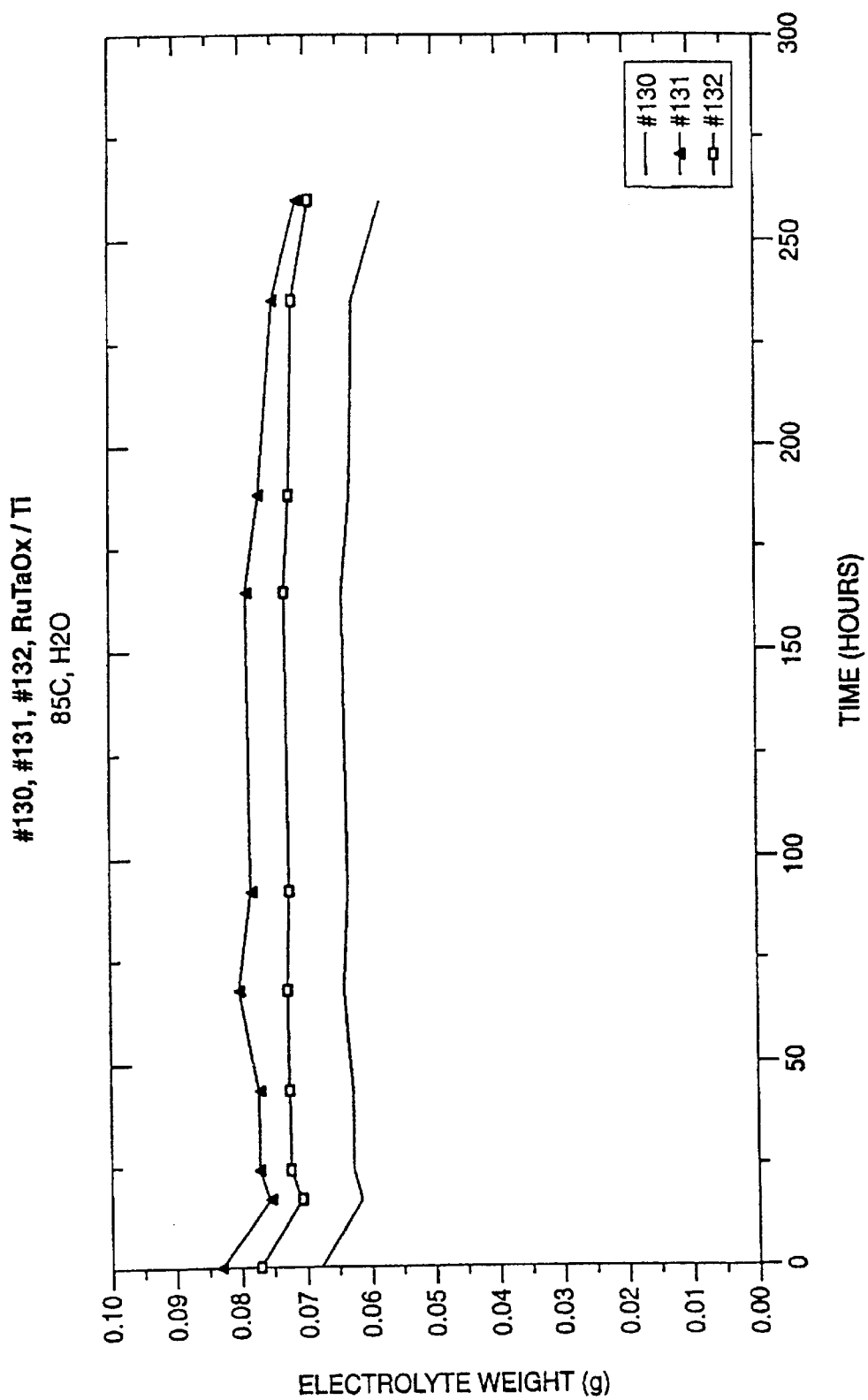
FIG._7

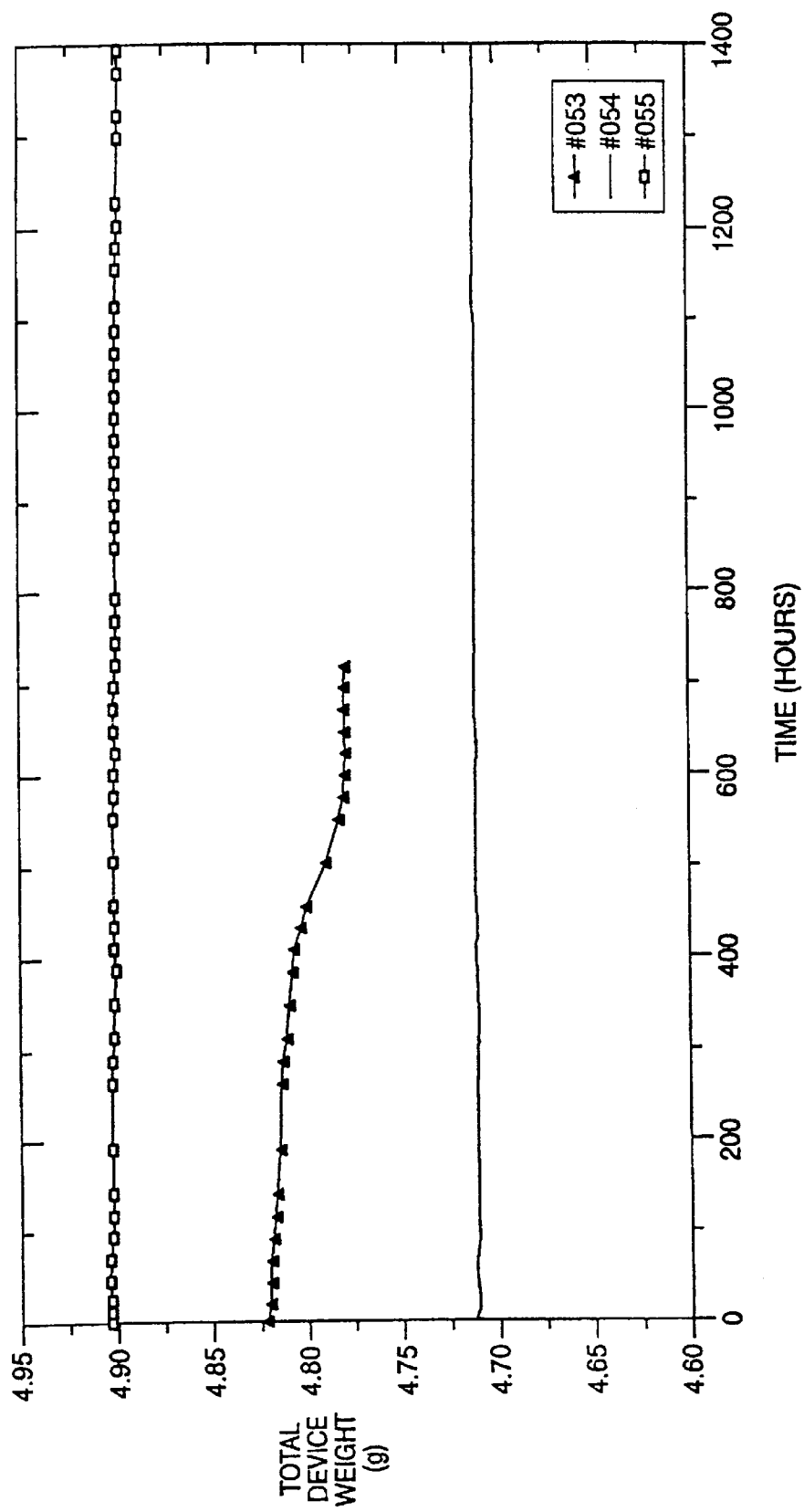
FIG._8

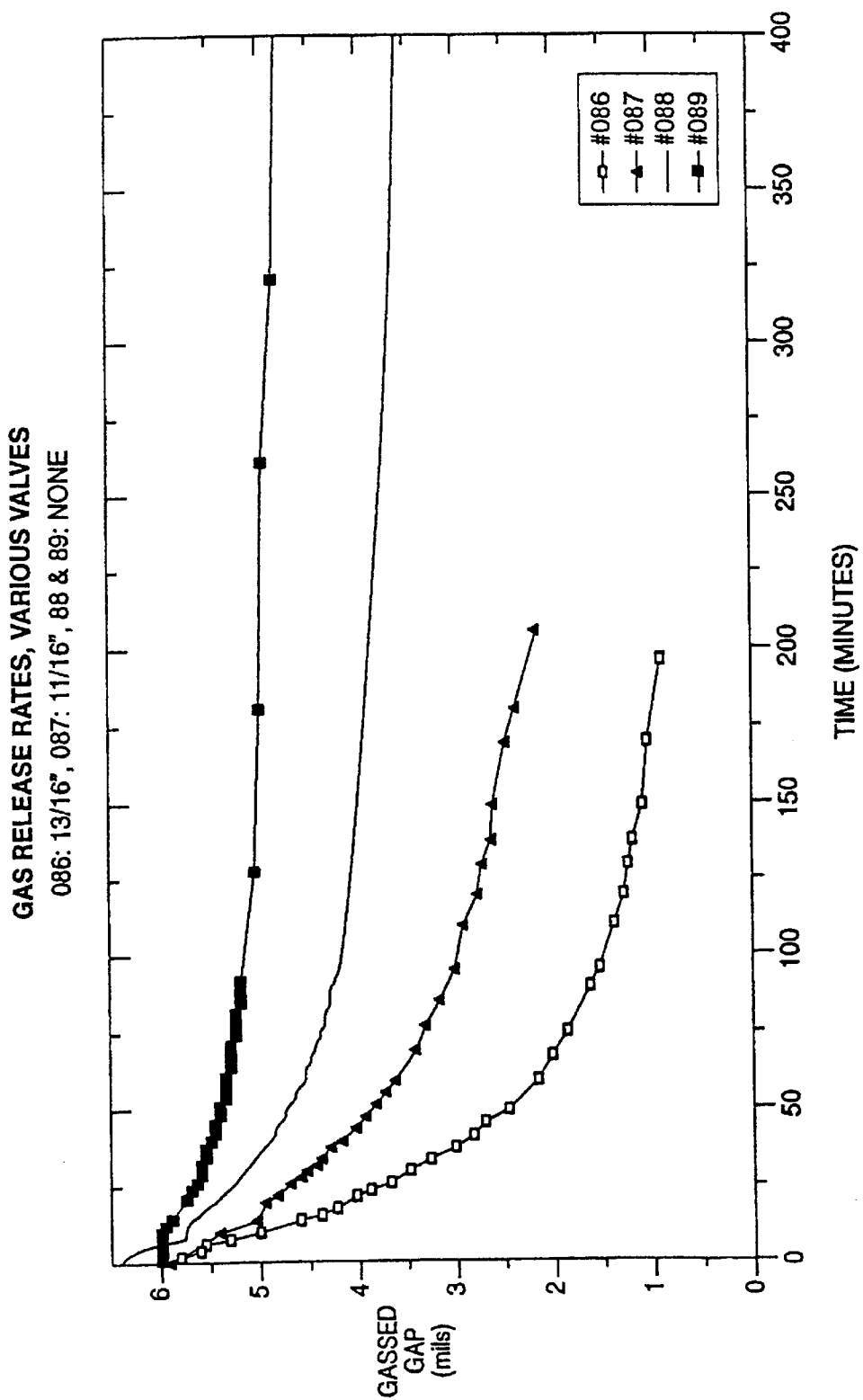
FIG._9

METHOD OF CONSTRUCTION OF ELECTROCHEMICAL CELL DEVICE USING CAPILLARY TUBING AND OPTIONAL PERMSELECTIVE POLYMERS

This present application is a continuation of U.S. application Ser. No. 08/778,971 filed Jan. 6, 1997, now abandoned.

BACKGROUND OF THE INVENTION

1. Field of the Invention

The present invention concerns an improved method to produce an electrical energy storage device and the improved device. In the construction of the coated substrate to create the individual cells, a capillary tube and optionally a permselective polymer are incorporated into the edge polymer of the device. The capillary tube is useful to introduce the liquid electrolyte into this cell under vacuum conditions and for the accurate metering the amount of liquid electrolyte into the cell. The capillary is then sealed. The permselective polymer aids in the retention of the liquid electrolyte, but permits the permeation of gases which might be produced during the electrical charging and discharging of the cells. The devices so produced are useful at elevated temperatures, i.e., +85° C. The present invention generally relates to an energy storage device, and more particularly to a bipolar double layer capacitor-type energy storage device, and to improved methods for manufacturing the same.

2. Description of the Related Art

Energy Storage Devices—There has been significant research over the years, relating to useful reliable electrical storage devices, such as a capacitor or a battery. Large energy storage capabilities are common for batteries; however, batteries also display low power densities. In contrast, electrolytic capacitors possess very high power densities and a limited energy density. Further, carbon based electrode double-layer capacitors have a large energy density; but, due to their high equivalent series resistance (ESR), have low power capabilities. It would therefore be highly desirable to have an electrical storage device that has both a high energy density and a high power density.

A review by B. E. Conway in *J. Electrochem. Soc., vol.* 138 (#6), p. 1539 (June 1991) discusses the transition from "supercapacitor" to "battery" in electrochemical energy storage, and identifies performance characteristics of various capacitor devices.

D. Craig, Canadian Patent No. 1,196,683, in November 1985, discusses the usefulness of electric storage devices based on ceramic-oxide coated electrodes and pseudo-capacitance. However, attempts to utilize this disclosure have resulted in capacitors which have inconsistent electrical properties and which are often unreliable. These devices cannot be charged to 1.0 V per cell, and have large, unsatisfactory leakage currents. Furthermore, these devices have a very low cycle life. In addition, the disclosed packaging is inefficient. Also, see D. Craig, European Patent 0 078 404.

M. Matroka and R. Hackbart, U.S. Pat. No. 5,121,288, discuss a capacitive power supply based on the Craig patent which is not enabling for the present invention. A capacitor configuration as a power supply for a radiotelephone is taught; however, no enabling disclosure for the capacitor is taught.

J. Kalenowsky, U.S. Pat. No. 5,063,340, discusses a capacitive power supply having a charge equalization circuit. This circuit allows a multicell capacitor to be charged without overcharging the individual cells. The present invention does not require a charge equalization circuit to fully charge a multicell stack configuration without overcharging an intermediate cell.

H. Lee, et al. in *IEEE Transactions on Magnetics,* Vol. 25 (#1), p.324 (January 1989), and G. Bullard, et al., in *IEEE Transactions on Magnetics,* Vol. 25 (#1) p. 102 (January 1989) discuss the pulse power characteristics of high-energy ceramic-oxide based double-layer capacitors. In this reference various performance characteristics are discussed, with no enabling discussion of the construction methodology. The present invention provides a more reliable device with more efficient packaging.

Carbon electrode based double-layer capacitors have been extensively developed based on the original work of Rightmire, U.S. Pat. No. 3,288,641. A. Yoshida et al., in *IEEE Transactions on Components, Hybrids and Manufacturing Technology,* Vol. CHMT-10, #1,P-100–103 (March 1987) discuss an electric double-layer capacitor composed of activated carbon fiber electrodes and a nonaqueous electrolyte. In addition, the packaging of this double-layer capacitor is revealed. This device is on the order of 0.4–1 cc in volume with an energy storage capability of around 1–10 J/cc.

T. Suzuki, et al., in *NEC Research and Development,* No. 82, pp. 118–123, July 1986, disclose improved self-discharge characteristics of the carbon electric double-layer capacitor with the use of porous separator materials on the order of 0.004 inches thick. An inherent problem of carbon based electrodes is the low conductivity of the material resulting in a low current density being delivered from these devices. A second difficulty is that the construction of multicell stacks is not done in a true bipolar electrode configuration. These difficulties result in inefficient packaging and lower energy and power density values.

Ultracapacitors provide one approach to meet the high power requirements for the advanced energy storage system for many uses, from cardiac pacemakers to cellular phones to the electric automobile. Until recently, the only packaged high power ultracapacitor material available for significant charge storage has been a mixed ruthenium and tantalum oxide (Z. W. Sun and K. C. Tsai, *J. Electrochem. Soc. Ext. Abs., vol.* 95-2, pp. 73–76 (1995) and R. Tong et al., U.S. Pat. No. 5,464,453 (1995)). Unfortunately, ruthenium and tantalum oxide are expensive.

Additional references of interest include, for example:

The state of solid state micro power sources is reviewed by S. Sekido in *Solid State Ionics, vol.* 9, 10, pp. 777–782 (1983).

M. Pham-Thi et al. in the *Journal of Materials Science Letters,* vol. 5, p. 415 (1986) discusses the percolation threshold and interface optimization in carbon based solid electrolyte double-layer capacitors.

Various disclosures discuss the fabrication of oxide coated electrodes and the application of these electrodes in the chlor-alkali industry for the electrochemical generation of chlorine. See for example: V. Hock, et al. U.S. Pat. No. 5,055,169 issued Oct. 8, 1991; H. Beer U.S. Pat. No. 4,052,271 issued Oct. 4, 1977; and A. Martinsons, et al. U.S. Pat. No. 3,562,008 issued Feb. 9, 1971. These electrodes, however, in general do not have the high surface areas required for an efficient double-layer capacitor electrode.

It would be useful to have a reliable long-term electrical storage device, and improved methods to produce the same. It would also be desirable to have an improved energy storage device with energy densities of at least 20–90 J/cc.

Packaging of Energy Storage Devices—As mentioned above, there has been significant research over the years regarding electrical storage devices of high energy and power density. The efficient packaging of the active materials, with minimum wasted volume, is important in reaching these goals. The space separating two electrodes in a capacitor or a battery is necessary to electrically insulate the two electrodes. However, for efficient packaging, this space or gap should be a minimum. It would therefore be highly desirable to have a method to create a space separator or gap that is substantially uniform and of small dimension (less than 5 mil (0.0127 cm)).

A common way to maintain separation between electrodes in an electrical storage device with an electrolyte present (such as a battery or capacitor) is by use of an ion permeable electrically insulating porous membrane. This membrane is commonly placed between the electrodes and maintains the required space separation between the two electrodes. Porous separator material, such as paper or glass, is useful for this application and is used in aluminum electrolytic and double layer capacitors. However, for dimensions below 1 or 2 mil (0.00254 to 0.00508 cm) in separation, material handling is difficult and material strength of the capacitor is usually very low. In addition, the open cross-sectional areas typical of these porous membrane separators are on the order of 50–70%.

Polymeric ion permeable porous separators have been used in carbon double layer capacitors as discussed by Sanada et al. in IEEE, pp.224–230, 1982, and by Suzuki et al. in *NEC Research and Development,* No. 82, pp. 118–123, July 1986. These type of separators suffer from the problem of a small open area which leads to increased electrical resistance.

A method of using photoresist to fill voids of an electrically insulating layer to prevent electrical contact between two electrode layers for use as a solar cell is disclosed by J. Wilfried in U.S. Pat. No. 4,774,193, issued Sep. 27, 1988.

A process of creating an electrolytic capacitor with a thin spacer using a photosensitive polymer resin solution is disclosed by Maruyama et al in U.S. Pat. No. 4,764,181 issued Aug. 16, 1988. The use of solution application methods described with a porous double-layer capacitor electrode would result in the undesirable filling of the porous electrode.

Some additional specific references in this art include the following:

PCT/US93/08803, filed Sep. 17, 1993, Inventors: Tsai, K. C. et al., Int. Pub. No.: WO 94/07272, Int. Pub. Date: Mar. 31, 1994.

PCT/US95/03985, filed Mar. 30, 1995, Inventors: Tsai, K. C. et al., Int. Pub. No.: WO 95/26833, Int. Pub. Date: Oct. 12, 1995.

PCT/US95/15994, filed Dec. 11, 1995; Inventors: L. T. Thompson et al., Int. Pub. No. WO 96/19003, Int. Pub. Date: Jun. 20, 1996.

D. A. Evans, U.S. Pat. No. 4,992,910.
R. Marchand, et al., in U.S. Pat. No. 4,964,016.
Robert R. Tong, et al., U.S. Pat. No. 5,464,453.
Robert Tong et al., U.S. Pat. No. 5,384,685.

Additional U.S. Pat. Nos. of general interest also include 4,515,763; 4,851,206; 5,062,025; 5,079,674; 4,327,400; and 5,185,679.

Additional references of general interest include U.S. Pat. Nos. 3,718,551; 4,816,356; 4,052,271; 5,055,169; 5,062,025; 5,085,955; 5,141,828.

All of the applications, patents, articles, references, standards, etc. cited in this application are incorporated herein by reference in their entirety.

In view of the above, it would be very useful to have one or more methods to produce a reliable small space separation between electrodes in electrical storage devices with a large open cross-sectional area into which a defined amount of liquid electrolyte is added. It is also desirable to provide a method to selective remove gasses while retaining aqueous or non-aqueous electrolyte during operation. The present invention provides these methods.

SUMMARY OF THE INVENTION

The present invention concerns an improved method to produce a dry preunit of an electrical storage device for storage of electrical charge in a condition to have the internal electrode surfaces contacted with a non-aqueous or aqueous electrolyte to store electrical charge in a double layer manner, which method comprises:

(a) preparing a thin in thickness substantially flat sheet of electrically conducting support material which is coated on each flat side with the same or a different thin layer of a second electrically conducting material having a high surface area, with the provision that both flat sides of the electrically conducting support is a sheet wherein the perimeter edge surfaces are devoid of the second electrically conducting material;

(b) creating an ion permeable or semipermeable space separator stable to the aqueous or non-aqueous electrolyte obtained by:

(i) depositing substantially uniform in height groups of electrically insulating microprotrusions, on the surface of at least one side of the thin layer of second electrically conducting material, (ii) placing a thin precut ion permeable or semipermeable separator on one surface of the second electrically conducting material, (iii) creating an ion permeable or semipermeable thin layer on the surface of at least one side of the electrically conducting material, or (iv) creating an air space as separator;

(c) contacting the perimeter edge surface of one or both sides of the thin sheet of step (b) with one or more layers of synthetic organic polymer as a gasket material selected from the group consisting of a thermoplastic polymer and an elastomeric polymer;

(d) placing on or within the gasket material and optionally across the thin sheet at least one capillary or tube of a different material in which the capillary has a higher melting point ($T_m$) greater than the gasket polymer material and does not melt, or flow under the processing conditions;

(e) producing a repeating layered stack of the thin flat articles of sheet coated with second electrically conducting material and separator produced in step (d) optionally having the top and bottom sheets consisting of a thicker support;

(f) heating the stack produced in step (e) at a temperature and applied pressure effective to cause the synthetic gasket material to flow, to adhere to, and to seal the edges of the stack creating a solid integral stack of layers of alternating electrically conductive sheet coated with second electrically conducting material and the ion permeable separator, optionally such that the gasket material creates a continuous integral external polymer enclosure, with the proviso that the capillary provides an open pathway to introduce the electrolyte; and (g) cooling the solid integral stack of step (f) optionally in an inert gas under slight pressure in step (f), wherein the alternating stack is sealed by heating the stack to between 5° and 100° C., above the $T_m$ of the thermoplastic gasket material.

The present invention also includes an improved method to produce a dry preunit of an electrical storage device, which method comprises:

(A) in the improved method described above step (d) also includes (d') means for selectively venting a gas generated in the package without exposure of the inside of the package to the ambient environment which means comprise at least one gas selective permeable body at the edge of the cell between the cell and ambient environment, which polymer body has a relatively high permeability of a gas generated within the device during the operation of the component, and a relatively low permeability to at least one desired fluid within the cell, and thereby avoids premature failure of the device.

It is an object of the present invention to provide new methods for manufacturing the storage device.

It is also another object of the present invention to provide a reliable long-term electrical storage device, and improved methods to produce the same.

It is a further object of the present invention to provide efficient packaging of an electrical storage device by reducing the gap between the anode and cathode, which reduces the electrical resistance of the ionically conducting electrolyte.

Briefly, the foregoing and other objects are attained by an energy storage device such as a capacitor, which includes a plurality of cells in a bipolar configuration. The cells are stacked and bonded together, to impart to the device an integral and unitary construction.

Each cell includes two electrically conductive electrodes that are spaced apart by a predetermined distance. The cell also includes at least one dielectric gasket that is interposed, on the perimeter in relation to each other, between the electrodes, for separating and electrically insulating these electrodes.

When the electrodes, and the gaskets are bonded together, at least one capillary opening is formed for each cell. Each cell also includes a high surface area (porous) electrically conductive coating layer that is formed on one (or, more) surface of each electrode. This coating layer optionally includes means to separate the high surface area layers from each other. These means impart structural support to the cells, and may provide additional insulation between the electrodes. An ionically conductive aqueous or non-aqueous electrolyte fills the cell gap and pores of the high surface area coating.

The present invention also discloses materials and the processes to edge seal the electrodes which are used in the manufacture of high electrical energy and power density devices, such as capacitors or batteries.

BRIEF DESCRIPTION OF THE FIGURES

The above and other features of the present invention and the manner of attaining them, will become apparent, and the invention itself will be best understood, by reference to the following description and the accompanying drawings, wherein:

FIG. 1 is a perspective view of a preunit 10 a dry energy storage device which is constructed according to the present invention;

FIG. 1A is a perspective view of the electrolyte-filled energy storage device 10A of the present invention;

FIG. 2 is a cross-sectional view of the storage device of FIG. 1 showing a polymer body 117A and a capillary 125A within the storage device, taken along line 2—2 thereof;

FIG. 2A is another cross-sectional view of the storage device of FIG. 1, taken along line 2A—2A thereof;

FIG. 3 is a schematic representation of an exploded view of the preunit of FIG. 1, illustrating three cells;

FIG. 4 is a block diagram of the manufacture steps of the storage device 10A;

FIG. 5 is a graphic representation of the percentage changes in ESR, electrolyte weight and cell gap distance over time (0 to 1000 hr) at 85° C. for a 1 cell capacitor of ruthenium oxide—tantalum oxide on a tantalum support material. The electrolyte is 2M sulfuric acid.

FIG. 6 is a graphic representation of the percentage of change in ESR, electrolyte weight and cell gap distance over time (hr) at 85° C. for a 1 cell capacitor of ruthenium oxide-tantalum oxide on a nobium support material sheet. The electrolyte is 2M sulfuric acid.

FIG. 7 is a graphic representation of the percentage of change in ESR, electrolyte weight and gap distance of about 100 microns over time in (hr) at 85° C. for a 1 cell capacitor of ruthenium-oxide-tantalum oxide on titanium support material sheet. The electrolyte is water.

FIG. 8 is a graphic representation of total weight (g) versus time (hr) of three capacitors having no permeable body, a 0.125 fluorosilicone permeable body and a 0.25 in fluorosilicone permeable body. The model using water and base metal Ti electrodes having the permeable body lasted for over 1400 hours. The capacitor without a permeable body appears to have failed after 700 hr.

FIG. 9 is a graphic representation of the gas gap (in mils) versus time (min) for four different cells of ruthenium oxide tantalum oxide on titanium having 2M sulfuric acid electroylte. The two which had permeable bodies released gas better than the two which did not.

DETAILED DESCRIPTION OF THE PREFERRED EMBODIMENTS

Definitions

As used herein:

The definitions of U.S. Pat. No. 5,464,453 are incorporated herein in their entirety. The definitions of the following terms are not intended to be exclusive:

"Capillary" refers to any commercial or independently produced polymer tube, silica tube, glass tube or combinations thereof. Suitable capillary tubes include those available from Polymicro Technologies, 18019 N. 25th Avenue, Phoenix, Ariz. 85023. Some tubes are silica coated with polyimide polymer.

"Electrically conducting support material" refers to any electrically conducting metal or metal alloy, electrically conducting polymer, electrically conducting ceramic, electrically conducting glass, or combinations thereof. Metals and metal alloys are preferred for producing stock units. Preferred metals include, for example, the metals of the following preferred metal oxides listed for the following second electrically conducting materials. The support material should have a conductivity of greater than about $10^{-4}$ S/cm.

"Etched" or "Pretreated" substrate refers to a metal foil or sheet which has been cleaned as described in U.S. Pat. No. 5,464,453, or by contact with a 6N HCl solution for 10–15 minutes.

"Halide" refers to the starting material metal chloride bromide or combinations thereof. Chloride is preferred.

"Liquid volatile carrier" refers to any organic liquid which has a boiling point at ambient pressure of about 200° C. or below. Usually, only combinations of carbon, hydrogen, oxygen and nitrogen are present. Suitable carriers include, but are not limited to ethanol, propanol, butanol, pentanol, hexanol, cycohexanol, diethyl ether, dioxane, tetrahydrofuran, dimethylacetamide, diethylacetamide, acetone, methylethyl ketone, butanone, ethyl acetate, propyl acetate, methylene chloride, chloroform, carbon tetrachloride, benzene, toluene, xylene, and mixtures thereof. Preferably, the alcohols are used, more preferably, ethanol and propanol.

"Second electrically conducting material" (having a high surface area) refers to a porous electrode coating which may be of the same or different composition on each side of the support material. Preferred metal oxides of the present invention include those independently selected from tin, lead, vanadium, titanium, ruthenium, tantalum, rhodium, osmium, iridium, iron, cobalt, nickel, copper, molybdenum, niobium, chromium, manganese, lanthanum, or lanthanum series metals or alloys or combinations thereof, and possibly containing additives like calcium to increase electrical conductivity.

"Electrolyte" refers to an ionically conductive aqueous or non-aqueous solution or material, which enables the dry preunit to be electrically charged.

"Cab-O-Sil®" refers to silica filler available from Cabot Corporation of Tuscola, Ill. A variety of sizes are available.

"Epoxy" refers to the conventional definition of the product which is an epoxy resin mixed with a specific curing agent, usually a polyamine. or polyepoxide mixed with a polyamine curing agent.

MYLAR® refers to a polyester of polyethylene terephthalate of DuPont, Inc. of Wilmington, Del. It is usually commercially available in sheet form of varying thicknesses.

"Metal oxynitride" refers to any electrically conducting metal oxynitride of metals of Groups Ill, IV, V, VI or VII of the Periodic Table. Preferably the metal is a transition metal. More preferably, the metal is independently selected from molybdenum, nobium, tantalum, titanium, vanadium, zirconium, or combinations thereof, and is especially titanium or molybdenum.

"Metal oxide" refers to any electrically conducting metal oxide.

"Mixed metal oxide" refers to an electrically conducting oxide compound comprised of two or more metal oxides, optionally mixed with a non-conducting compound.

"Permeable body" refers to an organic polymer which has a relatively high permeability to the gases produced within the device during electrical charge and discharge operation and a relatively low permeability to the aqueous or non-aqueous electrolyte.

"Photoresist" is any photo curable material. Usually, it is an epoxide or acrylate or combinations thereof.

"ConforMASK" is a negative working photopolymer available commercially from Dynachem of Tustin, Calif. This polymer should be used at 50% or less relative humidity.

Dry Preunit Energy Storage Device

Referring now to the drawings, and more particularly to FIGS. 1, 2 and 3 thereof, there is illustrated a dry preunit of energy storage device 10 which is constructed according to the present invention. The energy storage device is first an assembled dry preunit 10. After filling the present cells with an aqueous or non-aqueous electrolyte, the exterior surface is sealed (fused) (e.g. heat, uv), to form device 10A which is then electrically charged.

The device preunit 10 generally includes a plurality of cells, such as the cells 110, 112 and 114, which are formed, prepared, and stacked according to the teaching of the present invention. FIG. 1A illustrates an assembled view of the electrical storage device preunit 10A, formed of twelve superposed cells. It should however be understood to those skilled in the art, after reviewing the present specification that any different number of cells can be used.

For simplicity of illustration, FIG. 3 is an exploded view of a portion of the preunit 10, showing only three exemplary cells 110, 112 and 114. The cells have generally similar design and construction, and therefore, only the cells 114 and 112 will be described in detail, in relation to FIGS. 1, 2, 2A and 3.

The cell 114 includes a first electrically conductive external electrode or end plate 111A, and a second internal, electrically conductive bipolar electrode 111B. Both electrodes 111A and 111B are spaced apart at the edges by means of two dielectric or electrically insulating gaskets 121 and 123.

When the first and second electrodes 111A and 111B, and the insulating gaskets 121 and 123 and the electrically conducting porous material (oxide) layers 119 and 120 are bonded together to form the cell 114, a central air filled gap 130, e.g., (FIG. 2A) is formed by these elements. When the preunit 10 is ready to be used, the gap 130 is filled with an electrolyte (not shown) to produce device 10A.

An exemplary access capillary port, e.g., 125A to 125L is shown in FIGS. 1, 2 and 3 for illustration purposes only and is formed between the gaskets 121 and 123 in order to allow the electrolyte to fill the gap 130. The capillary port is formed by means of a prepared capillary tube 125A which is inserted between the gaskets 121 and 123 prior to busing or bonding the gaskets 121 and 123. When the gaskets 121 and 123 are heated the capillary tube 125A becomes surrounded by the reflow gasket material which causes the capillary port 125A to be formed. The two gaskets become a fused polymer mass covering none or a minimum of the active electrically conducting coating layers 119 and 120.

During the operation of the device, gases are often evolved which if not removed, will cause the device to fail. In the present invention, a permselective polymer body 125A TO 125L is incorporated into the device is shown in FIG. 3. Polymer body 117A is formed between the gaskets 121 and 123, in order for the gases to vent and to allow the liquid electrolyte to remain within the gap 130. The polymer body 117A which is inserted between the gaskets 121 and 123, prior to fusing or bonding the gaskets 121 and 123. When the gaskets 121 and 123 are heated, the polymer body 117A does not melt and becomes- surrounded by the reflow gasket material. The two gaskets become a fused polymer mass covering none or a minimum of the active electrically conducting coating layers 119 and 120.

Considering now the electrodes 111A and 111B in greater detail, the methods of manufacturing them are described later. One difference between the electrodes 111A and 111B is that the electrode 111A optionally includes a tab 160A, for connection to a power source (not shown).

A further, but optional distinction between the electrodes 111A and 111B, is that the electrode 111A includes one porous electrically conductive coating layer 119, which is deposited on a support material or structure 116, while the bipolar electrode 111B includes two porous coating layers 120 and 131, which are deposited on either or both sides of the support material or structure 118. As such, the electrode 111B is a true bipolar electrode. It should be understood that both sides of the electrode support 111B are preferably coated with porous electrically conductive layers. Preferably the porous high surface area material is removed at the edge and the surface is sandblasted to roughen the metal surface to achieve a better polymer bond of fused gaskets 121 and 123.

Yet another optional distinction between the electrodes 111A and 111B lies in the rigidity of the support structures 116 and 118. The electrode 111A, acting as an external end plate, should preferably have a more rigid construction, so that it imparts sufficient rigidity to the overall structure of the energy storage device 10A. The electrode 111B and other similar internal electrodes do not necessarily need to be as rigid as the external electrode 111A. Nonetheless, when the device 10A is large, additional support structure is required, and the internal electrodes, i.e. 111B, are used as additional support structure. In this case, it is desirable to rigidify the internal electrodes, i.e. 111B.

As a result, the support material 116 is generally thicker than the support material 118. In the preferred embodiment, the support material 116 has a thickness of about 10 mils (0.0254 cm), while the support material 118 has a thickness of about 10 mil (0.0254 cm). Other values could alternatively be selected.

The electrodes support 111A, 111B and the remaining electrodes of the storage device 10A, are sized and dimensioned according to the desired application, without departing from the scope of the invention. For instance, in one application, the device 10A is miniaturized, e.g. for a cardiac defibrillator. While in another application, the overall volume of the device is one cubic meter or even greater, e.g. for an electric vehicle. The dimensions of the electrodes determine the overall capacitance of the storage device 10A.

In a preferred embodiment, the electrode supports, i.e. 111A and 111B, are rectangularly shaped. However, these electrodes and consequently the preunit 10 could assume various other shapes, such as circular, square, etc. An important feature of the preunit 10 is the flexibility of its design, which enables it to be used in various applications.

Considering now the coating layers 119 and 120 in greater detail, the methods of forming them which is described in U.S. Pat. No. 5,384,685. In one embodiment, the coating layer 119 includes a plurality of microprotrusions, while the coating layer 120 does not include such microprotrusions. It should be understood, however, that the coating layer 120 could alternatively be designed similarly to the coating layer 119, without departing from the scope of the invention.

Considering now the coating layer 120, it serves a similar function as the coating layer 119, and is deposited on the side of the electrode support 111B, which faces the inner side of the first electrode support 111A. In one embodiment, the coating layer 120 does not include microprotrusions. In an alternative embodiment of the preunit 10, the coating layers 119 and 120 are similarly constructed, and include microprotrusion layers.

Considering now the gaskets 121 and 123, the methods of producing them will be described later. The gaskets 121 and 123 are generally identical, and are arranged in registration (adjacent and superposable) with each other. For brevity, only the gasket 121 will be described in greater detail. The gasket 121 includes a solid peripheral section and a hollow central section.

In the preferred embodiment, the polymer body 117A, or a part thereof, is placed between the gaskets 121 and 123, and extends into the hollow section, of the gaskets, and protrudes outside the peripheral section. In another embodiment, the polymer body does not extend across the central section of the gaskets, and only a part of the polymer body is sandwiched between the gaskets, but extends beyond both edges of one side of the gaskets.

Turning now to FIGS. 1, 2, 2A and 3, the next adjacent cell 112 is now briefly described. The cell 112 is generally similar in design and construction to the cell 114. The cell 112 includes the bipolar electrode support 111B, as its first electrode, and a second bipolar electrode support 111C. The electrode supports 111B and 111C are generally identical, and are spaced-apart, in registration with each other.

A porous coating layer 131, which is identical to the coating layer 119, is deposited on the surface of the support material 118, facing the electrode 111C. A coating layer 133, which is similar to the coating layer 120, is deposited on a support material or structure 140, which forms a part of the electrode 111C.

The coating at the edges of the support material is removed to allow a stronger bond to the substrate, to reduce leakage current, and to reduce loss of water vapor through the oxide.

The cell 112 further includes two gaskets 135 and 137 that are identical to each other and to the gaskets 121 and 123 of the cell 114. A capillary 125B forms a capillary port 125B between the gaskets 135 and 137.

The cell 110 is substantially similar to the cell 114, and includes a first bipolar electrode support 111Y, a second electrode 111Z, two gaskets 157 and 159, a polymer body 117C, a capillary 127C, and a tab 160. It should be noted that in FIG. 3, which is a 3-cell device, the inner electrode support 111Z is equivalent to electrode support 111A.

While not wanting to be bound by theory, an explanation of the operation of the capacitive energy storage device, at the molecular level is helpful to understand the enormous value of the electric double layer. For simplicity, to describe FIG. 3 can be used for reference where the same reference numbers are used (and the porous material is a mixed metal oxide).

Thus, the porous coatings 120 and 131 are coated onto support 118 to form bipolar electrode support 111B and coatings 133 and 133B are coated onto support 140 to form bipolar electrode 111C. After the preunit 10 is assembled, the preunit 10 is charged with electrolyte 190, and the capillary ports, e.g. 125A to 125L, are sealed with an oxyacetylene torch creating device 10A.

The device 10A is then charged electrically producing the following results at the same time:

Coating 120 becomes negatively charged. Electrically conducting support 118 conducts electrons accordingly. Thus, porous coating 131 becomes positively charged. The ionically conducting electrolyte ions align accordingly to balance the charge in the coating. An electric double layer is formed at the electrode-electrolyte interface forming the individual capacities. Thus, the surface of coating 133 becomes negatively charged, and the surface of coating 133B becomes positively charged. Because the porous high surface area oxide allows the effective surface area of the electrode to become very high, the corresponding electrical storage capacity of the device increases dramatically.

The capacitors of the present invention are assembled from multiple electrodes which are each a thin (metal) substrate which is thinly coated with generally fragile conductive oxide coatings. The oxide coating comprises porous grains having large inter granular cracks. The present thermoplastic materials and the method of their use in some units does not completely seal the cracks in the coating along the perimeter of the electrodes edges. As a result, the liquid electrolyte in each thermoplastic sealed device envelope seeps to the edges of the electrodes over time or under test conditions causing an electrical short between the adjacent cells. This leakage severely affects the performance, reliability and the life of the electrical storage, i.e. (capacitor) device.

Another object of this invention is to eliminate this chemical and electrical leakage problem to improve the reliability and life of the energy storage device.

Methods of Manufacturing the Energy Storage Device

Referring to FIGS. 1 to 4, a general description for the preferred method to produce the dry pre-unit 10 of the energy storage device 10A, is as follows:

(A) Support Material Preparation

The support material is optionally etched or cleaned by a variety of conventional pickling and cleaning procedures. The support material is any electrically conducting material, e.g. carbon, ceramic, metal, alloy, having a thickness of between about 0.01 and 100 mil. Preferably, metal or alloys are used, preferably having a thickness of between about 0.1 and 50 mil, more preferably about 1 to 10 mils.

In some experiments, if the metal surface is not etched it is too smooth. This smooth surface sometimes causes inadequate adhesion of the porous coating. The etch creates a suitable rough surface.

1. Wet Etching—A preferred procedure is to contact the metal support with an aqueous inorganic strong acid, e.g. sulfuric acid, hydrochloric acid, hydrofluoric acid, nitric acid, perchloric acid or combinations thereof. The etching is usually performed at elevated temperatures of 50 to 95° C. (preferably 75° C.) for about 0.1 to 5 hr (preferably 0.5 hr) followed by a water rinse. Room temperature acid etching is possible. An alkaline or an organic (e.g. oxalic) etch may also used.

2. Dry Etching—The roughened support surface is obtained by sputtering, plasma treatment, and/or ion milling. A preferred procedure is Ar RF sputter etching at between around 0.001 and 1 torr with about 1 KeV energy at 1 3.5 Mhz. Commonly, 0. 1–10 watts/cm$^2$ power densities for about 1–60 min. are used to clean and roughen the surface. Another procedure is to plasma etch the support with a reactive gas such as oxygen, tetrafluoromethane, and/or sulfurhexafluoride at around 0.1–30 torr for about 1–60 min.

3. Electrochemical Etching—The roughened surface is obtained by electrochemical oxidation treatment in a chloride or fluoride solution.

4. Mechanical Etching—The roughened support surface is contacted for about 1–5 min with 240 grit grade sandpaper. The surface is rubbed uniformly until about a 0.3% loss in weight is observed. The surface has a matte appearance, is smooth to touch, and, is not generally reflective to light.

(B) Coating of Support Material

The coating (e.g. oxide) is porous and composed of mostly micropores (diameter<17 Å). Large 0.1–1 $\mu$m wide cracks are present on the surface protruding to depths as thick as the coating. However, greater than 99% of the surface area arises from these micropores. The average diameter of these micropores are around 6–12 Å.

After various post-treatments the pore structure can be altered to increase the average pore size. For example, the steam post-treatment creates a bimodal pore distribution. In addition to the micropores, a narrow distribution of mesopores (diameter<17–1000 Å) having a diameter of about 35 Å is created. These treated electrode coatings have 85–95% of the surface area arising from the micropore structure.

With alternate electrode construction methods this pore size distribution can be varied. The effective high surface area of the coating is 1,000 to 10,000 to 100,000 times larger than the projected surface area of the electrode as a monolith. The pore size, distribution, and surface area controlled with the temperature of pyrolysis and/or high temperature water treatment. In addition, the use of surfactants to create micelles or other organized structures in the coating solution increases the average pore size up to values about 100–200 Å with only 5–10% of the surface area coming from micropores.

The electrode 111A includes a porous and conductive coating layer 119, which is formed on at least one surface of the support material 116. The support material 116 is electrically conductive, and sufficiently rigid to support the coating layer 119 and to impart sufficient structural rigidity to the device 10.

The unique characteristics of the present invention is primarily due to the novel construction as described herein. The ultracapacitor formed is unique among all electrical storage devices in the following ways.

It has:

One hundred times greater power density than any known battery;

Fifty times greater energy density than a conventional capacitor;

Charge and discharge rates of less than one second as compared with hours for conventional batteries;

Very long lifetime of the order 300,000 charge/discharge cycles as opposed to less than 1000 for a conventional battery;

Any voltage from 1.0 to hundreds of volts as compared to less than 2 volts for conventional batteries; e.g. 12 volts for the conventional lead acid, and the present novel device can be constructed in practically any configuration, size and shape.

The unique combination has enhanced performance specifically, by the sum of the construction methodologies, selected features as described herein which are needed in combination to achieve this performance.

One goal of the present invention, is to optimize the energy density and power density of the device 10. This object is achieved by reducing the thickness of the support material 116, and maximizing the surface area of the coating layer 119. The power density of the device 10 is further optimized, by maintaining a low resistance.

The surface area of the coating layer 119 is determined by the BET methodology, which is well known in the art. The surface enhancement, which is an indication of the optimization of the surface area of the coating layer 119, is determined according to the following equation:

Surface enhancement=(BET Surface Area/Projected Surface Area)

In the present invention, the surface enhancement values are as large as 10,000 to 100,000, and are usually greater than 50.

The coating layer 119 is porous, and its porosity could range between about five percent (5%) and ninety-five percent (95%). Exemplary porosity range for efficient energy storage is between about twenty percent (20%) and twenty-five percent (25%). The porous coating thickness is between about 1 and 200 micron, preferably between about 5 and 50 micron.

In conventional double-layer capacitors, the main device resistance is due to the carbon coating layer. In the present invention, most of the device resistance is due to the electrolyte, which has a higher resistance than that of the porous conductive coating layer.

When the preunit device 10 is filled with an electrolyte, it becomes ready to be charged to become device 10A. The main criterion for the electrolyte is to be ionically conductive and have bipolar characteristics. The boundary or interface region between the electrode and the electrolyte is referred to in the field, as the "double layer", and is used to describe the arrangement of charges in this region. A more detailed description of the double layer theory is found in "Modern Electrochemistry", by Bockris et al, volume 2, sixth printing, chapter 7 (1977).

The surface area of the coating layer affects the capacitance of the device 10A. If for instance, the surface enhancement factor is between 1,000 to 20,000, and the double layer capacitance density is between about 10 to 500 microfarad per $cm^2$ of the interfacial surface area (i.e. the BET surface area), then surface enhancement capacitance densities of about 0.1 to 10 farads/$cm^2$ for the projected surface area of the electrode are obtained. Although coating with any surface enhancement value are used within the scope of the present invention, larger surface area coatings are more preferred because of the increased capacitance density. Coatings with surface areas between about 10 and 1000 $m^2/cc$ are preferred, and preferred values between about 20 and 200 $m^2/cc$, more preferably about 100 $m^2/cc$.

While the double layer theory is described herein, it should be understood that other theories or models, such as the proton injection model, could alternatively be used without departing from the scope of the present invention. Further, the exact surface area porosity and coating thickness can be adjusted and modified by one of skill in the art having this application to meet and achieve the objectives of this invention.

The high surface area (porous) electrically conducting coating material is applied onto the support material.

1. Solution Methods—The porous coating material may originate from various reactive precursors in a solution or a sol-gel composition. Numerous methods of application of these precursor compositions are feasible; but not limited to the following. A curing, hydrolysis and/or pyrolysis process usually is performed to form the coating on the support. Pyrolysis of the metal salts is usually done in a controlled atmosphere (nitrogen, oxygen, water, and/or other inert and oxidative gasses) by means of a furnace and/or an infrared source.

(a) Dip Coating—The electrode or support, is dipped into a solution or sol-gel, coating the support with a precursor coating, and subsequently cured by pyrolytic and other methods. Optionally, this process may be repeated to increase layer thickness. A preferred procedure is to dip the support material in a metal chloride/alcohol solution followed by pyrolysis at between about 250 and 500° C. for 5–20 min in a 5–100% oxygen atmosphere.

This process is repeated until the desired weight of coating is obtained. A final pyrolysis treatment at 250–450° C. is done for 1–10 hr. Typically about 1–30 mg/$cm^2$ of coating is deposited onto a support for a capacitance density of around 1–10 F per square centimeter electrode cross-sectional area. Another procedure is to create a sol-gel solution with ruthenium, silicon, titanium and/or other metal oxides and coat the support as above. By adjusting the pH, water concentration, solvent, and/or the presence of additives like oxalic acid, formamide, and/or surfactants the discharge frequency characteristics of the coating may be adjusted.

High relative humidity during the pyrolysis step can be used to complete the conversion of starting material to oxide at lower temperatures. A procedure is to pyrolyze at about 300° C. without control of humidity. However, an additional procedure is to maintain the relative humidity above about 50% during this pyrolysis at temperatures of about 350° C. or below.

(b) Spray Coating—The coating solution is applied to the support by a spray method, cured, and optionally repeated to increase the thickness. A preferred procedure is to apply the coating solution to the substrate at a temperature of 0–150° C. by means of an ultrasonic or other spray nozzle with a flow rate of around 0.1–5 ml/min in a carrier gas composed of nitrogen, oxygen and/or other reactive and inert gases. The coating characteristics are controlled by the partial pressure of oxygen and other reactive gasses.

(c) Roll Coating—The precursor coating is applied by a roll coating methodology, cured, and optionally repeated to increase the thickness. The coatings described above for dip coating are usable here.

(d) Spin Coating—A spin coating methodology in the conventional art is used to apply the precursor coating, and optionally repeated to obtain the desired thickness.

(e) Doctor Blading—A doctor blading methodology is used to apply the precursor coating, and optionally repeated to obtain the desired thickness.

2. Electrophoretic Deposition—The porous coating or precursor coating is applied to the support by electrophoretic deposition techniques, and optionally repeated to obtain the desired thickness.

3. Chemical Vapor Deposition—The porous coating or precursor coating may be applied by chemical vapor deposition techniques known in the art.

(C) Electrode Pretreatment

It has been found that a number of pretreatments (conditioning) or combinations thereof are useful to improve the electrical characteristics of the coating (e.g. electrochemical inertness, conductivity, performance characteristics, etc.). These treatments include for example:

1. Steam—High temperature water or steam treatment controlled in atmospheres can be used to decrease the leakage current. A method procedure is to contact the coated electrode with water saturated steam in a closed vessel at between 150 and 325° C. for between 1 to 6 hr. under autogenic pressure.

2. Reactive Gas—The coated electrode is contacted one or more times with a reactive gas such as oxygen, ozone, hydrogen, peroxides, carbon monoxide, nitrous oxide, nitrogen dioxide, or nitric oxide at between about ambient temperature and 300° C. at a reduced pressure or under pressure. A preferred procedure is to contact the coated electrode with flowing ozone at between about 5–20 weight percent in air at between about ambient and 100° C. and 0.1–2000 torr pressure for 0.1–3 hr.

3. Supercritical Fluid—The coated electrode is contacted with a supercritical fluid such as carbon dioxide, organic solvent, and/or water. A preferred procedure is treatment with supercritical water or carbon dioxide for 0.1–5 hrs by first raising the pressure then the temperature to supercritical conditions.

4. Electrochemical—The coated electrode is placed in a sulfuric acid electrolyte and contacted with an anodic current sufficient to evolve oxygen gas and subsequently with a cathodic current. In one embodiment the electrode is contacted with 10 mA/$cm^2$ in 0.5M sulfuric acid for about 5 min, to evolve oxygen gas. The electrode is then switched to a cathodic current and the open circuit potential is driven back to a potential of between about 0.5V–0.75V, preferably between 0.5 and 0.6 and more preferably about 0.5 V (vs. NHE) with out hydrogen gas evolution.

5. Reactive Liquid—The coated electrode is contacted with an oxidizing liquid such as aqueous solutions of hydrogen peroxide, ozone, sulfoxide, potassium permanganate, sodium perchlorate, chromium (VI) species and/or combinations thereof at temperatures between about ambient to 100° C. for 0.1–6 hr. A preferred procedure uses a 10–100 mg/l aqueous solution of ozone at 20–50° C. for between a about 0.5–2 hr. followed by an aqueous wash. An additional procedure is to treat the coated electrode in a chromate or dichromate solution.

(D) Spacing between Electrodes

A number of methods are available to obtain electrical insulation and properly defined spacing between the electrodes. The electrode spacing is usually between 0.1 and 10 mil, preferably 1 to 10 mil. These spacings are used so that an optional electrically insulating separator of a smaller thickness can placed between the electrodes. The separators is for example, air, multiple protrusions, a thin sheet, a permeable membrane, etc. These microprotrusions may be composed of thermosets, thermoplastics, elastomers, ceramics, or other electrically insulating materials. These methods include, for example:

1. Several methods of applying these microprotrusions are included, but not limited to:

(a) Screen Printing—The microprotrusions are placed on the electrode surface by conventional screen printing, as described below, in greater detail, in U.S. Pat. No. 5,384,414, which is incorporated by this reference in its entirety. Various elastomers, thermosets, photo curable plastics, and thermoplastics are applied in this way. A preferred procedure is to use an acid resistant epoxy or VITON® solution.

(b) Chemical Vapor Deposition—Microprotrusions are also placed on the electrode surface by depositing silica, titania and/or other insulating oxides or materials through a mask.

2. Physically thin separator sheet—The separator between the electrodes is a thin, substantially open structure material such as glass. A preferred material is 0.001–0.005 in (0.0254 to 0.01270 cm) in thickness porous glass sheet available from Whatman Paper, Ltd. located in Clifton, N.J.

3. Casting a separator—The separator between the porous material is also obtained by casting a thin, substantially open structure film such as for example NAFION®, polysulfones, or various aero- and sol-gels.

4. Air space—The separator between the electrodes is also an air space which is subsequently occupied by the non-aqueous or aqueous electrolyte.

(E) Gasketing

The materials used for the gaskets, such as the gaskets 121, 123, 135, 137, 157 and 159, at the edge of the active electrode surface include any organic polymer which is stable in the electrical/chemical environment, and to the processing conditions. Suitable polymers include, for example polyimide, TEFZEL®, polyethylene (high and low density), polypropylene, other polyolefins, polysulfone, KRATON® other fluorinated or partly fluorinated polymers or combinations thereof. The gasket may be applied as a preformed material, screen printed, perimeter edge dipping in a polymer solution or by other methods.

The capacitors of the present invention are assembled from multiple electrodes which are each a thin (metal) substrate which is thinly coated with generally fragile conductive oxide coatings. The oxide coating comprises porous grains having large inter granular cracks. The present thermoplastic materials and the method of their use in some units does not completely seal the cracks in the coating along the perimeter of the electrodes edges. As a result, the liquid electrolyte in each thermoplastic sealed device envelope seeps to the edges of the electrodes over time or under test conditions causing an electrical short between the adjacent cells. This leakage severely affects the performance, reliability and the life of the electrical storage, i.e. (capacitor) device. Typical gasket thickness valves are between about 0.1 and 20 mil, preferably between about 1 and 10 mil. The gasket perimeter edge width is between about 0.001 and 1 inch, preferably between about 0.01 and 0.5 inch, depending upon the ultimate electrode area, size and shape. The capillary and/or polymer body is thinner than the electrode separation generally having a thickness (or diameter) of between about 0.05 and 10 mil (depending on the spacing between the electrodes), and if not circular, have a width of between about 1 and 50 mil.

(F) Capillary Port

The capillary tube (125A, 125B and 125C) is of any suitable material having some specific properties, e.g., it is different from the gasket materials, has a higher melting temperature ($T_m$), i.e. about 5 to 200° C. greater, preferably about 10 to 100° C. greater, than the gasket material, and does melt, flow or adhere to the gasket material under the heating conditions described herein. Generally, glass, silica, metal, ceramic, and organic polymers or combinations thereof are used. A polymer covered glass (silica) capillary is preferred.

(G) Stacking

A stack is created by starting with an endplate and alternating gasket material, cord, electrode, gasket, capillary tube, polymer body electrode until the desired number of cells are created finishing with a second endplate, and optionally with a gasket material on the top outside of the stack.

(H) Assembling (heating and cooling)

The stack is heated under pressure to cause reflow of the gasket material, adhering and sealing the perimeter of the electrode materials to the adjacent electrode in the stack; thereby, creating isolated cells and an assembled stack unit. This is done in an inert atmosphere.

(a) Radio Frequency Induction Heating (RFIH) is used to heat the stack to cause reflow of the gasket material.

(b) Radiant Heating (RH) is used to uniformly heat the stack to cause reflow of the gasket material. A preferred method is to use 1–100 $\mu$m radiation at 0.5–10 watts/cm$^2$ for 1–20 min.

(c) Conductive and/or convective heating in a furnace, optionally in an inert atmosphere, is used to heat the stack to cause reflow of the gasket material.

(I) Post-Conditioning

1. A number of post-conditioning reactive gas treatments of the stack or assembled stack or combinations thereof are useful to improve the overall and long term electrical characteristics of the electrode and resulting device. These include either before step (H) and/or after step (I) treatment with hydrogen, nitric oxide, carbon monoxide, ammonia, and other reducing gasses or combinations thereof at between ambient temperature and the $T_m$ of the gasket material at a reduced pressure or under pressure.

2. A second post conditioning commonly done in the art is to adjust the open circuit potential of the electrode after step (F) and stack the electrode in an inert atmosphere (e.g. Ar, $N_2$). This is done by using a cathodic current without hydrogen evolution.

(J) Filling of the Dry Preunit

The dry preunit is filled with an ionically conducting aqueous or non-aqueous electrolyte.

A preferred electrolyte is approximately 30% sulfuric acid in water due to the high conductivity. Non-aqueous electrolytes based on propylene carbonate and ethylene carbonate are also used to obtain larger than 1.2V/cell potentials.

A preferred procedure for filling the dry preunit with liquid electrolyte is to place the preunit in a chamber, evacuate the chamber between about 1 torr to 1 microtorr, preferably about 250 mtorr to less than 1 torr, and introduce the electrolyte; thereby, filling the cell gaps with electrolyte through the capillary tube. Alternatively, the preunit may be placed in the electrolyte and a vacuum pulled; thereby causing the gas in the cell gaps to be removed and replaced by the electrolyte. This evacuation and back fill is repeated three times. It is also possible to use the capillary to introduce an exact amount of electrolyte. Usually two capillaries (inlet and outlet) are used and the cell is evacuated.

In addition, non liquid based electrolytes (e.g. solid and polymer) may be used. In those cases the electrode is coated with the electrolyte before reflow and a fill port is not required.

(K) Sealing of Capillary Tube

The capillary is sealed by any technique known in the art. Preferably high temperature is needed, e.g., oxyacetylene torch, carbon arc, etc.

(L) Burn-In

The device is brought to full charge usually by charging the device in 0.1 V/cell steps at a charging current of about 4 mA/cm$^2$.

(M) Testing

Termination Methods—Several methods are used to make electrical connections to the ultracapacitor endplates, and are described below.

1. Endplate Tabs (160 and 160A)—The endplates (111A and 111Z) themselves have been cut to extend out beyond the normal gasket perimeter. These extensions allow attachment of a wire or ribbon. Typically, the extension is a stub from which all coating material (e.g. oxide) is removed down to the bare support material; 5 mil (0.0127 cm) thick nickel ribbon is spot welded to the stub.

2. Silver Epoxy—The coating is removed from the exposed faces of the endplates or the endplates may be coated only on one side. Clean nickel foil leads or copper plates make electrical connection to the exposed faces by bonding them together with a conductive silver epoxy. Optionally, the coating (e.g. oxide) is present.

3. Lugs—Threaded metal nuts are welded to the thick metal endplates before coating. Electrical connection to the titanium nuts is achieved by screw attachment.

4. Press Contacts—The coating (e.g. oxide) is removed or the endplates may be coated only on one side from the exposed side of the endplates before assembly into the device stack. The bare support material e.g. titanium, is reverse sputtered to clean the surface, being careful not to overheat the substrate. The clean surface is then sputtered with titanium to lay down a clean adhesion layer, followed by gold. The gold acts as a low contact resistance surface to which electrical contact can be made by pressing or by wire bonding.

5. Deposition of a compatible medium such for example aluminum, gold, silver, etc. outside by CVD or other means.

The device resistance is measured at 1 kHz. The device capacitance is determined by measuring the coulombs needed to bring the device to full charge at a charging rate of around 4 mA/cm$^2$ of electrode area. Leakage current is measured as the current needed to maintain a full charge after 30 min. of charging.

These devices may be made in various configurations depending on the desired application. By adjusting the device voltage, cell voltage, electrode area, and/or coating thickness in a rational manner, devices made to fit defined and predetermined specifications are constructed.

The electrode capacitance density (C' in units of F/cm$^2$) is roughly 1 F/cm$^2$ for every 10 μm of coating. Therefore, for large capacitance values a thicker coat is used. The device capacitance (C) is equal to the electrode capacitance density times the electrode area (A in units of cm$^2$) divided by two times the number of cells (n) (equation 1).

The leakage current (i") is proportional to the electrode area, A' while the equivalent series resistance (ESR) is inversely proportional to the electrode area (eqn. 2). Typical values for i" are less than 20 μA/cm$^2$.

The total number of cells in a device (n) is equal to the cell voltage (V') divided by the total device voltage (V) (eqn. 3). Cell voltages up to about 1.2 V can be used with aqueous based electrolytes.

The device height (h), based on a cell gap (h') and a support thickness (h"), is determined from the number of cells and the electrode capacitance density in units of cm by equation 4.

The device ESR is a function of the number of cells (n) times the cell gap (h') times the resistivity of the electrolyte (r) times a factor of about 2 divided by the area A' (equation 5).

| | |
|---|---|
| eqn. 1 | C = C'A'/2n |
| eqn. 2 | i" α A'α 1/ESR |
| eqn. 3 | n = V/V' |
| eqn. 4 | h/cm = n(0.002C' + h' + h") |
| eqn. 5 | ESR ≈ 2nh'r/A' |

Devices are constructed to meet the requirements of various applications by considering the voltage, energy, and resistance requirements. The following examples are not meant to be limiting in any way:

For electric vehicle applications about a 100 KJ to 3 MJ device is used. A large voltage (about 100 to 1000 V) large energy (1–5 F/cm$^2$) storage device is used with an electrode area of about 100 to 10,000 cm$^2$.

For electrically heated catalyst applications for the reduction of automobile cold start emissions about a 10 to 80 KJ device is used. This device is about 12 to 50 V constructed with around 100 to 1000 cm$^2$ area electrodes of 1–5 F/cm$^2$. Optionally, a device consisting of several devices in parallel can be constructed to meet the electrical requirements.

For defibrillator applications about a 200–400 V device with 0.5 to 10 cm$^2$ area electrodes of 1–3 F/cm$^2$ are used.

For uninterruptable power source applications various series/parallel device configurations are used.

The energy storage device 10A has a multitude of applications, as a primary or back up power supply, and/or as a capacitor. The size is from 0.1 volt to 100,000 volts or 0.1 cm$^3$ to 106 cm$^3$. Typical voltage ranges may include combinations of uses in automotive and other applications.

The following examples are presented to be descriptive and explanatory only. They are not to be construed to be limiting in any manner.

General:

EXAMPLE 1 (Tantalum Support)

Fabrication of A Dry Preunit Having a Capillary Tube (A) Coating Method

The support structure is prepared by etching a 10 mil (0.0254 cm) tantalum sheet with mechanical sanding 240 grit to a 0.3% weight loss. The end plates are 5 mil (0.0127 cm) titanium.

The oxide coating solution is 0.25 M ruthenium trichloride trihydrate and 0.25 M tantalum pentachloride in isopropanol (reagent grade).

The etched Ta sheets are dip-coated by immersion into the solution at ambient conditions. The coated sheet is submerged into the solution, held for about 1 sec and then removed.

After each coating, the oxide is dried at 70° C. for 10 min, pyrolyzed at 350° C. for 10 min and removed to cool to ambient temperature all in ambient atmosphere.

The dip-coating steps are repeated for 10 coats (or any desired number) rotating the Ta sheet so as to dip with alternate sides down. A thickness of about ten microns is achieved.

The fully coated sheet is final annealed at 350° C. for 3 hrs in ambient atmosphere.

(B) Electrode Pretreatment

The coated electrode is contacted with saturated steam in a closed vessel at 280° C. for 3 hrs under autogenic pressure.

(C) Spacing

The spacing of these small electrode devices is the air space (about 100 micron). A fiberglas woven paper Development grade F 017 from Whatman Specialty Products Inc., Clifton, N.J. 07014 is used by cutting to fit the internal space (130).

(D) Gasket

A modified high density polyethylene (HDPE, improved puncture resistance and adhesion) 1.5 mil (0.00381 cm) thick by 30 mil (0.0762 cm) wide with outside perimeter the same as that of the electrode is placed on the electrodes on the same side as the microprotrusions and impulse heat laminated. The HDPE is grade PJX 2242 obtained from Phillips-Joanna located in Ladd, Ill.

(E) Capillary Tube

One capillary tube is placed across the narrow dimension of the gasket. The location of the capillary tube is not critical, e.g., one of three positions centered, left of center, or right of center.

A second HDPE gasket is placed on the first gasket sandwiching the capillary tube between the two gaskets.

The second gasket is impulse heated to adhere to the first gasket and to fix the capillary tube in place.

($E^1$) Polymer Body

At least one polymer body (e.g., 117A) high density polypropylene grade PJX 2135 from Phillips Joanna of Ladd, Ill. is inserted within the gaskets and may be simultaneous with the placement of the capillary tube.

(F) Stacking

Electrode/glass/gasket/capillary/gasket units are stacked in a non-metallic (ceramic) alignment fixture beginning with a 10 mil (0.0254 cm) end plate unit to the desired number of cells and ending with a plain 10 mil (0.0254 cm) end plate with the capillaries arranged such that the location is staggered-left, center, right in a three unit repeating cycle (end perspective). Light pressure is applied to the top of the stack through a ceramic piston block to maintain uniform alignment and contact throughout the stack.

(G) Reflow

A radio frequency induction heater (2.5 kW) is used to heat the stack. The stack was placed centrally in the three turn, 3 in (7.62 cm) diameter coil and heated for 90 seconds at a power setting of 32%. The fused unit is allowed to cool to ambient temperature.

The preunit obtained is evacuated in 2M sulfuric acid to back fill the electrolyte through the capillary tubes. The vacuum is drawn to about 0.1 mm Hg, released, and is repeated three times. The capillary tubes are sealed quickly using an oxyacetylene torch.

The capacitor is tested at 85° C. as is shown in FIG. 5, and is stable for over 1000 hr.

EXAMPLE 2 (Nobium Support)

Alternative Fabrication of Dry Preunit (A) Coating Method

The support structure is prepared by etching a 10 mil (0.0254 cm) niobium sheet by mechanical sanding using 240 grit sandpaper for a 0.3% weight loss. The end plates are 10 mil (0.00254 cm) niobium.

The oxide coating solution is 0.25 M ruthenium trichloride trihydrate and 0.25 M tantalum pentachloride in isopropan of (reagent grade).

The etched Nb sheets are dip-coated by immersion into the solution at ambient conditions. The coated sheet is submerged into the solution, held for about 1 sec and then removed.

After each coating, the oxide is dried at 70° C. for 10 min. in ambient atmosphere, pyrolyzed at 330° C. for 15 min in a 3 cubic feet per hrs. flow of 50 vol. % oxygen and 50% nitrogen, and removed to cool to ambient temperature in ambient atmosphere.

The dip-coating steps are repeated for 30 coats (or any desired number) rotating the Nb sheet so as to dip with alternate sides down.

The fully coated sheet is final annealed at the above conditions for 3 hr.

(C) Spacing

The spacing is created by the construction, and the space is filled using a 3 mil precut glass paper (Whatman).

(D) Gasket

A modified high density polyethylene (HDPE, improved puncture resistance and adhesion) 3.0 mil (0.00762 cm) thick by 100 mil (0.2540 cm) wide with outside perimeter the same as that of the electrode is impulse heat laminated to both sides of the electrode. The HDPE is grade PJX 2242 from Phillips-Joanna of Ladd, Illinois.

(E) Capillary

A capillary tube is placed on the gasket as is shown in FIG. 3. The internal portion is just within the inside edge of the gasket. The external portion extends a short distance so that it can be sealed using an oxyacetylene torch.

($E^1$) Polymer Body

A piece of selectively permeable fluorosilicone polymer (Dow Corning, #730 RTV Fluorosilicone Sealant, Midland Mich.) is placed on the gasket as shown in FIG. 3. The polymer acts as a permselective vent for gases while retaining the liquid electrolyte. It is at least as wide as the gasket. It is 5 mil high and 0.25 in thick.

(F) Stacking

Electrode/microprotrusion/gasket/capillary/polymer body/gasket units are stacked beginning with a 10 mil (0.0254 cm) end plate unit to the desired number of cells and ending with a plain 10 mil (0.0254 cm) end plate with the cords arranged such that the location is staggered-left, center, right in a three unit repeating cycle (end perspective).

(G) Reflow

The HDPE gasket is reflowed in nitrogen by heating from 25° C. to 165° C. to 25° C. in one minute to reflow the thermoplastic. The unit is cooled in nitrogen to ambient temperature.

The preunit obtained is evacuated in 2M sulfuric acid to back fill the electrolyte through the capillary tubes. The vacuum is pulled to about 0.1 min Hg released and repeated twice or more. The capillaries are sealed quickly using an oxyacetylene torch.

The capacitor is tested at 85° C. as is shown in FIG. 6 and is stable for over 1000 hr.

EXAMPLE 3 (Titanium Support)

Alternative Fabrication of Dry Preunit (A) Coating Method

The support structure is prepared by etching a 10 mil (0.0254 cm) titanium sheet with 50% HCl at 75° C. for 30 min. The end plates are 10 mil (0.0254 cm) titanium.

The oxide coating solution is 0.2 M ruthenium trichloride trihydrate and 0.2 M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 300° C. for 5 min and removed to cool to ambient temperature all in ambient atmosphere.

The dip-coating steps are repeated for 10 coats (or any desired number) rotating the Ti sheet so as to dip with alternate sides down.

The fully coated sheet is final annealed at 300° C. for 3 hrs in ambient atmosphere.

(B) Electrode Pretreatment

The coated electrode is contacted with saturated steam in a closed vessel at 260° C. for 2 hrs under autogenic pressure.

(C) Spacing

Microprotrusions are screen printed on one side of the electrode, as described below, in greater detail, under the heading "SCREEN PRINTING". The epoxy compound is grade EP21AR from Masterbond, Hackensack, N.J.

The epoxy protrusions are cured at 150° C. for 4 hr. in air. The coated electrodes are next die-stamped to the desired shape.

(D) Gasket

A modified high density polyethylene (HDPE, improved puncture resistance and adhesion) 1.5 mil (0.00381 cm) thick by 30 mil (0.0762 cm) wide with an outside perimeter the same as that of the electrode is placed on the electrodes on same side as the microprotrusions and impulse heat laminated. The HDPE® is grade PJX 2242 from Phillips-Joanna of Ladd, Ill.

(E) Capillary Tube

A capillary tube as described in Example 1 is used.

(E²) Polymer Body (Vent) (Polypropylene)

The polymer body of polypropylene (3 mil high) 0.5 wide and about as thick as the gasket is used as described in Example 2. (Phillips Joanna of Ladd, Ill.)

(F) Stacking

Electrode/microprotrusion/gasket/capillary/polymer body/gasket units are stacked beginning with a 10 mil (0.0254 cm) end plate unit to the desired number of cells and ending with a plain 10 mil (0.0254 cm) end plate with the capillaries arranged such that the location is staggered, center, right in a three unit repeating cycle (end perspective).

(G) Reflow

The gasket is reflowed in nitrogen at 160° C. for 45 min to reflow the thermoplastic. The unit is cooled in nitrogen gas to ambient temperature.

EXAMPLE 4

Alternative Fabrication of Dry Preunit (A) Coating Method

The support structure is prepared by etching a 10 mil (0.0254 cm) titanium sheet with 50% HCl at 75° C. for 30 min. The end plates are 5 mil (0.0127 cm) titanium.

The oxide coating solution is 0.2 M ruthenium trichloride trihydrate and 0.2 M Ti(di-isopropoxide)bis 2,4-pentanedionate in ethanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 350° C. for 5 min in oxygen and removed to cool to ambient temperature all in ambient atmosphere.

The dip-coating steps are repeated for 30 coats (or any desired number) rotating the Ti sheet so as to dip with alternate sides down.

The fully coated sheet is final annealed at 350° C. for 3 hrs in an oxygen atmosphere.

(C) Spacing

Microprotrusions are produced by spraying through a mask on one side of the electrode, a thermally cured organohalogen polymer, such as TEPLON® from E.I. DuPont de Nemours & Co., Wilmington, Del.

The TEFLON® protrusions are cured at 300° C. for 0.5 hr. in air. The coated electrodes are next die-stamped to the desired shape.

(D) Gasket

A modified high density polyethylene (HDPE, improved puncture resistance and adhesion) 1.5 mil (0.00381 cm) thick by 30 mil (0.0762 cm) wide with outside perimeter the same as that of the electrode is placed on the electrodes on same side as the microprotrusions and impulse heat laminated. The HDPE is grade PJX 2242 from Phillips-Joanna of Ladd, Ill.

(E) Capillary Tube

The capillary tube is placed on the gasket as described in Example 1.

(E¹) Polymer Body

The polymer body of fluorosilicone is placed as is described in Example 2.

A second HDPE® gasket is placed on the first gasket sandwiching the capillary and polymer body between the two gaskets.

The second gasket is impulse heated to adhere to the first gasket and to fix the capillary and polymer body in place.

(F) Stacking

Electrode/microprotrusion/gasket/capillary/gasket units are stacked beginning with a 5 mil (0.0127 cm) end plate unit to the desired number of cells and ending with a plain 5 mil (0.0127 cm) end plate with the cords arranged such that the location is staggered-left, center, right in a three unit repeating cycle (end perspective).

(G) Reflow

The gasket is reflowed in nitrogen at 190° C. for 30 min. to reflow the thermoplastic. The unit is cooled in nitrogen to ambient temperature.

EXAMPLE 5

Filling of the Cell Gap Space

A dry preunit 10 may be filled with an electrolyte with the following procedure. Any of many possible dry preunit configurations may be used.

(H) Back Fill

The capillary tube port is open. The stacked unit is placed into an evacuation chamber and evacuated to <35 mtorr for 5 to 60 min. The liquid electrolyte 2 M $H_2SO_4$ de-aerated with nitrogen, is introduced into the chamber and fills the evacuated space between the electrodes.

(I) Seal Capillary Port Openings

The electrolyte filled preunit is removed from the chamber. It is rinsed with deionized water to remove excess electrolyte and dried. The externally protruding capillary tubes are sealed using an oxyacetylene torch.

(J) Conditioning

The device is charged up to full charge beginning at 0.1 V/cell increasing by 0.1 V/cell until 1 V/cell is obtained.

(K) Testing

The device is tested in the conventional manner, having 1 V/cell with leakage current of less than 25 $\mu A/cm^2$, and a capacitance density per a cell of greater than about 0.1 $F/cm^2$. A 10 V device has a height of no more than 0.05", a 40 V device has a height of no more than 0.13", and a 100 V device has a height of no more than 0.27".

EXAMPLE 6

Alternative Backfill of Dry Preunit

A dry preunit 10 may be filled with an electrolyte with the following procedure. Any of many possible dry preunit configurations may be used.

(H) Back Fill

The capillary tube port is open. The stacked unit is placed into an evacuation chamber and evacuated to <35 mtorr for 5 to 60 min. The liquid non-aqueous electrolyte 0.5 M $KPF_6$ in propylene carbonate de-aerated with nitrogen is introduced into the chamber and fills the evacuated space between the electrodes.

(I) Seal Capillary Port Openings

The electrolyte filled preunit is removed from the chamber and excess electrolyte is removed. The external capillary tube ports are sealed quickly using a carbon arc torch.

(J) Conditioning

The device is charged up to full charge beginning at 0.1 V/cell increasing by 0.1 V/cell until 1.5 V/cell is obtained.

(K) Testing

The device is tested in the conventional manner, having 1.5 V/cell with leakage current of around 100 $\mu A/cm^2$, and a capacitance density of around 4 $mF/cm^2$ for a 10 cell device.

EXAMPLE 7

Thermal Elastomeric Gasket

An alternative construction methodology is to sandwich a thermal elastomer gasket (e.g. KRATON®) between the two HDPE gaskets. Device characteristics are similar to those previously described.

EXAMPLE 8

Inclusion of Second Material to Accommodate Electrolyte Volume Increases

A porous hydrophobic material is added to each cell to accommodate any volume increase of the electrolyte due to an increase in temperature.

This material is placed in the cell as either a gasket material inside the perimeter HDPE gasket, or as a disk replacing part of the separator material.

A common material used is a PTFE material from W. L. Gore & Associates, Inc. 1–3 mil thick. Preferably, the PTFE material has water entry pressures from between about 20 to 100 psi.

EXAMPLE 9

Alternate Electrode Pretreatment

After the electrodes have microprotrusions, gaskets, and pull cords or tabs (after step E), the electrodes are placed in 1M sulfuric acid and the open circuit potential is adjusted to about 0.5V (vs NHE) using a cathodic current with no hydrogen evolution. The electrodes are transferred submerged in deionized water to an inert atmosphere (e.g. Ar) where they are dried and assembled.

EXAMPLE 10

Thermoelastomer Gaskets I a. Preparing the Electrodes—1.3 Mil substrates are coated with 15 coats of ruthenium trichloride hydrate (0.4M) and tantalum pentachloride (0.4M) in isopropanol solution by the "standard method" described herein of dip coating and pyrolysis. These substrates are then cut into electrodes of size 5.0 in.×3.2 in. Steam post treatment is performed, as described above at 300° C. for 3 hr on these electrodes.

b. Edge Sealing—The electrode edges are dip coated along the perimeter to a depth of 5 mm with 5.0 wt. % solution of KRATON® (FG 1901 Shell, Houston, Tex.) as a mixture of 90.0 wt. % toluene and 10 wt. % of isopropanol. After standing at ambient temperature and pressure for 3 hr, the electrodes are heated at 100° C. for 2 hr to remove the solvent.

c. Stacking—Window frame shape gaskets of 3.0 mm width and the outside dimensions corresponding to the electrode size are cut from a 6 mil thick high density polyethylene (HDPE) material. An 8 cell unit is stacked by placing, attached with eight capillary tubes, followed by the HDPE gasket. A 1.0 mil glass separator is placed within the inside of the frame of the HDPE gasket, followed by the next electrode. This procedure is repeated until an 8 cell device is stacked which requires 9 electrodes. This assembly is placed within two flat parallel plates fixture. The device is thermally reflowed at 190° C. for 30 min to melt the HDPE and form an edge seal when cooled to ambient conditions. On cooling to ambient, the pull tabs capillary ports are open. The device is filled with electrolyte as described above.

d. Test Results—The device is tested in the conventional manner with 1 volt per cell applied. This device has an ESR value of 14.0 mOhms, a capacitance value of 4.975F and leakage current of 2.9 mA are obtained. The device is further subjected to cycle testing and a satisfactory performance of over 100,000 cycles is obtained.

EXAMPLE 11

Thermoelastomer Gaskets II (a) (b) Steps (a) and (b) of Example 18 are performed.

c. Stacking—A 4 cell unit is produced by stacking electrodes, attached to capillary tubes, followed by applying a thick line of KRATON® solution with a syringe along the perimeter of the flat surface of the electrode about 3.0 mm from the edge of the electrode. A 1.0 mil glass separator is placed within the inside of this KRATON® line frame followed by the next electrode. This procedure is repeated until a 4 cell device is stacked which requires 5 electrodes. This assembly is placed within two flat parallel plate fixture. The device is allowed to stand under ambient conditions for 12 hr. The device is then convective heated at 100° C. for 2–3 hr to remove the solvent. On cooling, the capillary tubes are open. The device is filled with electrolyte described herein above. The fill ports are sealed using KRATON® solution at ambient conditions.

d. Test Results—The device is tested in the conventional manner with 1 volt per cell applied. The ultra capacitor device test results are comparable to the results obtained in Example 18.

EXAMPLE 12

Thermoelastomer Gaskets III a. Preparing the Electrodes—1.1 Mil Ti substrates coated with 15 coats of 0.8M mixed metal oxide of Example 18 solution by the "standard method" described above of dip coating are obtained. These are then cut into electrodes of size 5.0 in.×3.2 in. Steam post treatment is performed, as described herein. Insulating separators of epoxy are applied by the method of screen printing as described in U.S. Pat. No. 5,384,685, which is incorporated herein by reference.

b. Edge Sealing—The electrode edges are dip coated along the perimeter to a depth of 5 mm with 5.0 wt. % solution of KRATON® made in a mixture of 90.0 wt. % toluene and 10 wt. % of isopropanol dipped 3 times. Additional coats of thicker 20% KRATON® solution are applied multiple times to develop a gasket of 5 mil on each side of the electrode perimeter to a depth of about 5.0 mm. After standing at ambient temperature and pressure for 1 2 hr, the electrodes are heated at 100° C. for 3 hr to remove the solvent.

c. Stacking and Reflow—A 6 cell unit is stacked by-putting electrodes, using a capillary tube, followed by the next electrode. This procedure is repeated until a 6 cell device is stacked which requires 7 electrodes. The assembly is placed within two flat parallel plates fixture. The device is thermally reflowed to melt KRATON® and form a seal at 170° C. and 10–50 psi. On cooling, the capillary tubes are open and the device is filled with electrolyte as described above. The electrolyte fill ports are sealed by using the KRATON® solution described in Example 19.

d. Test Results—The device is tested in the conventional manner with 1 volt per cell applied. This device has an ESR value of 10.0 mOhms, and a capacitance value of 5.133F and a leakage current of 2.4 mA obtained after one hour test. Continuing testing produces a leakage current of milliamps 0.24 (mA) after 48 hr.

EXAMPLE 13

Thermo Elastomer Gaskets IV a. Preparing the Electrodes—2 Mil Ti substrates are coated with 10 coats of 0.8M mixed metal oxide of solution of Example 18 by the "standard method" of dip coating. These are then cut into electrodes of size 5.0 in.×7.0 in. Insulating protrusions (separators) of photoresist are applied by the method of photo processing as described herein and in U.S. patent application Ser. No. 07/958,506, filed October 1992.

b. Edge Sealing—The electrode edges are dip coated along the perimeter to a depth of 5 mm with 5.0 wt. % solution of KRATON® made in a mixture of 90.0 wt. % toluene and 10 wt. % of isopropanol (dipped 3 times). After standing at ambient temperature and pressure for 3 hr, the electrodes are heated at 100° C. for 1.0 hr to remove the solvent. Electrochemical post treatment is performed, as described above, on these electrodes.

c. Stacking and Reflow—Window frame shaped gaskets of 3.0 mm width and the outside dimensions corresponding to the electrode size are cut from a 6 mil thick high density polyethylene (HDPE) material. An 15 cell unit is stacked by placing electrodes, attached with capillary tubes, followed by the HDPE gasket followed by the next electrode. This procedure is repeated till an 15 cell device is stacked which requires 16 electrodes. This assembly is placed within a two flat parallel plates fixture. The device is thermally reflowed melt HDPE and to form an edge seal in the controlled atmosphere. On cooling, the capillary tubes are open, and the device is filled with electrolyte as described herein.

d. Test Results—The device is tested in the conventional manner with 1 volt per cell applied. This device has an ESR value of 13.0 mOhms, a capacitance value of 7.1 F and a leakage current of 5.4 mA, which properties are obtained after a one hour test.

EXAMPLE 14

Painting Edges And Sealing a. Preparing the electrodes

Two mil Ti substrates coated with 15 coats of 0.8M mixed ruthenium oxide and tantalum oxide solution by the standard method of coating of Example 4 are obtained. These articles are cut into electrodes of size of about 5.0×3.2 in. Steam post treatment is performed, as described in Example 3, on the electrodes. Insulating separators of epoxy resin are applied by the method of screen printing as described in U.S. Pat. No. 5,055,169.

b. Edge sealing

The electrode edges are dip coated along the perimeter to a depth of about 5 mm with a 5.0 wt % solution of KRATON® in a mixture of 90.0 wt % toluene and 10 wt % of isopropanol 3 times. Additional coats of thicker 20% KRATON® solution are applied multiple times to develop a gasket of 5 mil thickness on each side of the electrode perimeter to a depth of about 5.0 mm. After allowing the object to stand at ambient temperature and pressure for 12 hr, the electrodes are heated at 100° C. for 3 hr to remove the solvent.

c. Stacking

A 32 cell unit is stacked by putting electrodes, attached with capillary tubes, followed by the next electrode. The is repeated e.g. of Example 5 till a 32 cell device is stacked which requires 33 electrodes. This assembly is put within two flat parallel plates fixture and the device is thermally reflowed at about 20° C. to 200° C. to melt KRATON® and to form a seal in the inert atmosphere. On cooling, the capillary tubes are open, and the device is filled with electrolyte as described herein. The electrolyte fill ports are sealed by using the oxyacetylene torch method.

d. Test results

The device is tested in the conventional manner with 1 volt per cell applied. This device has an ESR value 10.0 mOhms, a capacitance value of 5.133F and a leakage current of 2.4 mA, results which are obtained after a one hour test.

While only a few embodiments of the invention have been shown and described herein, it will become apparent to those skilled in the art that various modifications and changes can be made in the improved method using capillary tubes and polymer bodies to produce an electrical storage device such as a battery or a capacitor having improved lifetime and charge/recharge characteristics and low leakage current, and the device thereof without departing from the spirit and scope of the present invention. All such modifications and changes coming within the scope of the appended claims are intended to be carried or thereby.

I claim:

1. An improved method to produce a dry preunit of an electrical storage device having a hollow capillary port for storage of electrical charge in a condition to have the internal electrode surfaces contacted with a non-aqueous or aqueous electrolyte to store electrical charge in a double layer manner, which method comprises:

(a) preparing a thin in thickness substantially flat sheet of electrically conducting support material coated on each flat side with the same or different thin layer of porous electrically conducting material having a high surface area, with the provisio that on both flat sides of the electrically conducting support material wherein the perimeter edge surfaces are devoid of porous electrically conducting material;

(b) creating an ion permeable or semipermeable space separator stable to the aqueous or non-aqueous electrolyte, the space separator is obtained by:
 (i) depositing substantially uniform in height groups of electrically insulating microprotrusions, on the surface of at least one side of the thin layer of porous electrically conducting material,
 (ii) placing a thin precut ion permeable or semipermeable separator on one surface of the porous electrically conducting material, or
 (iii) creating an ion permeable or semipermeable thin layer on the surface of at least one side of the porous electrically conducting material, or
 (iv) creating an air space as separator;

(c) contacting the perimeter edge surface of one or both sides of the thin sheet of step (a) with one or more layers of synthetic organic polymer as a gasket material selected from the group consisting of a thermoplastic and an elastomeric polymer;

(d) placing on or within the gasket material and optionally across the thin sheet at least one polymer coated hollow capillary tube of a different material, wherein the hollow capillary tube has a melting point ($T_m$) greater than the gasket material and permanently adheres to the gasket material under the processing conditions;

(e) producing a repeating layered stack of the thin sheet coated with porous electrically conducting material and a separator produced in step (b), therefore forming a plurality of cells;

(f) heating the stack produced in step (e) at a temperature and applied pressure effective to cause the gasket material to flow, to adhere to, and to seal the edges of the stack creating a solid integral stack of layers of alternating electrically conductive sheet coated with porous electrically conducting material and the ion permeable separator, such that the gasket material creates a continuous integral external polymer enclosure with the proviso that the hollow capillary tube provides a pathway to introduce the electrolyte into the preunit;

(g) cooling the solid integral stack of step (f) optionally in an inert gas under slight pressure, wherein the integral stack is sealed, except for the hollow capillary tube by heating the integral stack to between 5° and 100° C., above the $T_m$ of the gasket material;

(h) sealing the at least one hollow capillary tube after the electrolyte is introduced into the preunit.

2. The method of claim 1 wherein:

the capillary tube comprises a glass coated with a polymer selected from the group consisting of polyimide, polyurethane, polyepoxide, and polysilicone.

3. The method of claim 2 wherein:

the capillary tube has an internal diameter of between about 5 and 50 micron and an external diameter of between about 80 and 200 micron.

4. A method of producing an electrical energy storage device, which method comprises:

(h) preweighting the preunit device obtained in claim 1;

(i) placing the entire device formed in claim 1 in a pre weighted aqueous or non-aqueous electrolyte;

(j) subjecting the device to a vacuum of at least 0.01 mm of mercury;

(k) releasing the vacuum whereby the electrolyte is backfilled into the cells;

(l) repeating steps (j) and (k) as needed to completely fill the cells of the device;

(m) sealing the at least one capillary tube, thereby creating the electrical storage device, and (n) optionally weighing the filled electrical storage device and the remaining external aqueous or non-aqueous electrolyte to determine the electrolyte uptake.

5. The method of claim 4 which further includes:

(o) encasing the electrical storage device of claim 4 with a metal covering or a polymeric material to improve the long term effective life of the device.

6. The method of claim 3 wherein:

the capillary tube has a diameter of about 10 micron and an external diameter of about 100 micron.

7. The method of claim 1 wherein:

the porous electrically conducting material is selected from the group consisting of transition metal oxides, nitrides, carbides, borides, oxynitrides, and combinations thereof.

8. The method of claim 6 wherein:

the porous electrically conducting material is selected from transition metal oxides and combinations thereof.

9. The method of claim 8 wherein:

the transition metal oxides are selected from ruthenium oxide, tantalum oxide and combinations thereof.

10. The method of claim 1 wherein:

in step (a) the support material is selected from titanium, niobium or tantalum, and the porous electrically conducting material is selected from ruthenium oxide, tantalum oxide or combinations thereof;

in step (b) a precut permeable separator is used;

in step (c) the synthetic organic polymer is selected from high density polyethylene or high density polypropylene;

in step (d), the capillary tube is a polyimide coated silica capillary tube, optionally a gas selectively permeable venting body is incorporated into the edge of each cell.

11. An improved method to produce a dry preunit of an electrical storage device, which method comprises:

(A) in the improved method described in claim 1 step (d) also includes (d') means for selectively venting a gas generated in the package without exposure of the inside of the package to the ambient environment which means comprise at least one gas selectively permeable body at the edge of the cell between the cell and ambient environment, which body has a relatively high permeability of a gas generated within the device during the operation of the component and a relatively low permeability to at least one desired fluid within the cell, and thereby avoid premature failure of the device.

12. The method of claim 11 wherein:

the selectively permeable body is selected from the group consisting of silicone rubber, polypropylene, natural rubber, butyl rubber, tetrofluoroethylene, polyethylene or combinations thereof.

13. The method of claim 12 wherein:

the selectively permeable body is selected from high density polyethylene or polypropylene.

14. The method of claim 11 wherein:

the porous electrically conducting material having a high surface area is selected from the group consisting of transition metal oxides, carbides, nitrides, borides, oxynitrides and combinations thereof.

15. The method of claim 14 wherein:

the porous electrically conducting material is selected from transition metal oxides and combinations thereof.

\* \* \* \* \*